United States Patent
Kim

(10) Patent No.: US 8,223,257 B2
(45) Date of Patent: Jul. 17, 2012

(54) FOCAL PLANE SHUTTER, PHOTOGRAPHING APPARATUS INCLUDING THE SAME, AND PHOTOGRAPHING METHOD FOR THE PHOTOGRAPHING APPARATUS

(75) Inventor: Myung-gyu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 406 days.

(21) Appl. No.: 12/512,225

(22) Filed: Jul. 30, 2009

(65) Prior Publication Data

US 2010/0026881 A1 Feb. 4, 2010

(30) Foreign Application Priority Data

Jul. 31, 2008 (KR) .................. 10-2008-0075339

(51) Int. Cl.
*H04N 5/225* (2006.01)
*H04N 9/09* (2006.01)
*H04N 9/097* (2006.01)

(52) U.S. Cl. ........................ 348/362; 348/374
(58) Field of Classification Search .......... 348/362, 348/374

See application file for complete search history.

(56) References Cited

U.S. PATENT DOCUMENTS

| | | | |
|---|---|---|---|
| 4,295,726 A | 10/1981 | Inoue | |
| 5,475,459 A * | 12/1995 | Matsubara et al. | 396/484 |
| 5,822,629 A | 10/1998 | O'Brien | |
| 2006/0067676 A1 * | 3/2006 | Toyoda | 396/466 |
| 2007/0242950 A1 * | 10/2007 | Tenmyo | 396/463 |
| 2008/0175583 A1 * | 7/2008 | Seita | 396/357 |
| 2009/0041447 A1 * | 2/2009 | Kim et al. | 396/246 |

FOREIGN PATENT DOCUMENTS

| | | |
|---|---|---|
| JP | 2000-047285 A | 2/2000 |
| JP | 2002-162668 A | 6/2002 |
| JP | 2002-182269 A | 6/2002 |
| JP | 2003-023560 A | 1/2003 |
| JP | 2004-038117 A | 2/2004 |
| JP | 2005-099318 A | 4/2005 |
| JP | 2006-153988 A | 6/2006 |

* cited by examiner

*Primary Examiner* — Gevell Selby
(74) *Attorney, Agent, or Firm* — Drinker Biddle & Reath LLP

(57) ABSTRACT

A focal plane shutter, a photographing apparatus including the same, and a photographing method for the photographing apparatus are provided. More specifically, provided are a focal plane shutter, which is easily manufactured and controlled because of its simple mechanical structure and can offer a live view function, a photographing apparatus including the focal plane shutter, and a photographing method for the photographing apparatus. The focal plane shutter includes a front curtain and a rear curtain for moving relative to each other to expose and conceal the focal plane shutter, a cam for independently controlling movements of the front curtain and the rear curtain, a front curtain lever interposed between the front curtain and the cam to transmit movement of the cam to the front curtain, and a rear curtain lever interposed between the rear curtain and the cam to transmit movement of the cam to the rear curtain.

27 Claims, 19 Drawing Sheets

FOCAL PLANE SHUTTER, PHOTOGRAPHING APPARATUS INCLUDING THE SAME, AND PHOTOGRAPHING METHOD FOR THE PHOTOGRAPHING APPARATUS

CROSS-REFERENCE TO RELATED PATENT APPLICATION

This application claims the benefit of Korean Patent Application No. 10-2008-0075339, filed on Jul. 31, 2008 in the Korean Intellectual Property Office, the entire contents of which is incorporated by reference.

BACKGROUND OF THE INVENTION

1. Field of the Invention

The present invention relates to a focal plane shutter, a photographing apparatus including the same, and a photographing method for the photographing apparatus, and more particularly, to a focal plane shutter, which is easily manufactured and controlled because of its simple mechanical structure and can offer a live view function, a photographing apparatus including the focal plane shutter, and a photographing method for the photographing apparatus.

2. Description of the Related Art

It is now easier for novice photographers to take photographs like professional photographers due to the popularization of digital single lens reflex (DSLR) cameras, which are single lens reflex cameras that take digital photographs.

Here, "single lens reflex" refers to a method of transmitting light of an object to a viewfinder through a single lens or transmitting the light to a sensor that can record an image. Frequently used consumer-grade digital cameras are twin lens digital cameras. Therefore, an image that can be seen through a viewfinder of a consumer-grade digital camera is different from an image photographed with the generally used digital camera.

In a conventional single lens reflex camera, a mirror is formed on an optical axis of a lens so as to be rotatable within a predetermined angular range about the optical axis. Under normal conditions, object light obtained by the lens is reflected by the mirror, and an image of an object is formed on a focus plate. Thus, a photographer can view the image of the object by using a pentaprism and a viewfinder. At this time, when a shutter-release signal is input, the mirror rotates around a shaft within the predetermined angular range and ascends to retreat from the optical axis of the lens. When a shutter is opened under the control of a shutter driving circuit, the image of the object is formed on an image pickup device.

In such a conventional single lens reflex camera as described above, a shutter moving to allow light to pass for only a predetermined period of time is disposed in front of an image pickup device. This shutter is called a focal plane shutter because it is located in front of an image pickup device.

However, a conventional focal plane shutter is connected to a quick return system of a single lens reflex camera and thus has a complicated mechanical structure. As a result, it is not easy to manufacture and control such a conventional focal plane shutter.

Since a lens for use in a digital single lens reflex camera can be interchanged with standard lenses or lenses designed exclusively for digital cameras, suitable lenses can be selectively used according to the preference or objective of a user. Also, since digital single lens reflex cameras generally have an image pickup device much bigger than that of other conventional digital cameras, the generation of noise can be prevented under low illumination conditions and a more precise image can be captured.

However, since the mirror is located to cover the image pickup device, an image cannot be seen on a liquid crystal display (LCD) during shooting, that is, a live view (also known as a preview) function is not offered, and the LCD of the single lens reflect camera can only be used to perform menu manipulation and an image review following image capture. That is, since an image should be seen through an optical viewfinder, the ability to view the image to be formed is limited when taking a picture at certain postures/positions, such as, at a low angle and a high angle, and thus this decreases the ability and convenience of photography using such a camera. Also, when a subject which is sensitive to action, such as a bird, is to be photographed using a single lens reflect camera, the user must view the subject for a long time. However, in this situation, use of the single lens reflect camera is inconvenient because the user must view the subject through the optical viewfinder and because the single lens reflect camera is too heavy to hold for a long time in the same position.

SUMMARY OF THE INVENTION

The present invention provides a focal plane shutter, which has a simple structure, is easily controlled, and can offer a live view function, a photographing apparatus including the focal plane shutter, and a photographing method for the photographing apparatus.

According to an aspect of the present invention, there is provided a focal plane shutter comprising: a front curtain and a rear curtain moving relative to each other to expose and conceal the focal plane shutter; a cam independently controlling movements of the front curtain and the rear curtain; a front curtain lever interposed between the front curtain and the cam to transmit movement of the cam to the front curtain; and a rear curtain lever interposed between the rear curtain and the cam to transmit movement of the cam to the rear curtain.

As the cam rotates, the front curtain lever and the rear curtain lever may rotate independently from each other.

The cam may comprise a front curtain control unit and a rear curtain control unit. The front curtain control unit may control a position of the front curtain lever, and the rear curtain control unit may control a position of the rear curtain lever.

The cam may be formed to rotate in one direction. While the cam is rotating in one direction, the front curtain may expose or conceal the focal plane shutter according to relative positions of the front curtain control unit and the front curtain lever, and the rear curtain may expose or conceal the focal plane shutter according to relative positions of the rear curtain control unit and the rear curtain lever.

According to another aspect of the present invention, there is provided a focal plane shutter comprising: a front curtain and a rear curtain rotating about an rotation shaft and formed to be rotatable independently from each other; a cam installed on an identical side of the front curtain and the rear curtain to be rotatable about the rotation shaft, controlling movements of the front curtain and the rear curtain; a front curtain lever interposed between the front curtain and the cam to transmit a rotation force of the cam to the front curtain; and a rear curtain lever interposed between the rear curtain and the cam to transmit the rotation force of the cam to the rear curtain.

The front curtain and the rear curtain may rotate independently from each other as the cam rotates.

The cam may comprise a front curtain control unit formed in a fan shape having a first angle, and a rear curtain control unit formed in a fan shape having a second angle.

The first angle of the front curtain control unit may be different from the second angle of the rear curtain control unit.

The front curtain control unit and the rear curtain control unit may form a step and control rotations of the front curtain and the rear curtain, respectively.

The front curtain control unit from among the front curtain control unit and the rear curtain control unit may be formed to contact the front curtain lever, and the rear curtain control unit may be formed to contact the rear curtain lever.

While the front curtain lever contacts an arc of the front curtain control unit, the front curtain lever may not rotate but maintain a fixed state. While the rear curtain lever contacts an arc of the rear curtain control unit, the rear curtain lever may not rotate but maintain a fixed state.

A front curtain magnet may be further installed on one side of the front curtain lever, and thus while the front curtain lever contacts the arc of the front curtain control unit, the front curtain lever may contact the front curtain magnet. A rear curtain magnet may be further installed on one side of the rear curtain lever, and while the rear curtain lever contacts the arc of the rear curtain control unit, the rear curtain lever may contact the rear curtain magnet.

The focal plane shutter may further comprise: a front curtain spring providing a predetermined elastic force to the front curtain lever so that the front curtain lever does not contact the front curtain magnet while not contacting the front curtain control unit; and a rear curtain spring providing a predetermined elastic force to the rear curtain lever so that the rear curtain lever does not contact the rear curtain magnet while not contacting the rear curtain control unit.

The front curtain spring may provide the predetermined elastic force to the front curtain lever so that the front curtain lever rotates in a direction away from the front curtain magnet. The rear curtain spring may provide the predetermined elastic force to the rear curtain lever so that the rear curtain lever rotates in a direction away from the rear curtain magnet.

Each of the front curtain and the rear curtain may comprise at least two films.

A pin may protrude from the front curtain lever, a guide hole may be formed in the front curtain, and a rotation of the front curtain lever may be transmitted to the front curtain by inserting the front curtain pin into the guide hole.

A pin may protrude from the rear curtain lever, a guide hole may be formed in the rear curtain, and a rotation of the rear curtain lever may be transmitted to the rear curtain by inserting the rear curtain pin into the guide hole.

The focal plane shutter may further comprise a motor providing a predetermined driving force. The cam may be rotated in one direction by the driving force provided by the motor.

A worm gear may be coupled with the motor, and grooves may be formed at regular intervals on an outer circumference of the cam to engage with the worm gear, such that the driving force of the motor may be converted into a rotation of the cam.

A contact switch may be further formed on one surface of the cam, and the amount of rotation of the cam may be controlled by the contact switch.

According to another aspect of the present invention, there is provided a photographing apparatus comprising: a lens through which light is incident; an image pickup device converting the incident light into an electrical signal; a display unit displaying an image formed by the image pickup device; and a focal plane shutter with any one of the above-described focal plane shutter structures, interposed between the lens and the image pickup device to control the amount of light incident upon the image pickup device.

According to another aspect of the present invention, there is provided a photographing method performed with a photographing apparatus comprising a focal plane shutter, the photographing method comprising: opening the focal plane shutter by using a cam independently controlling rotations of a front curtain and a rear curtain of the focal plane shutter, so as to perform a live view function; closing the focal plane shutter by rotating the cam, when a shutter release signal is received; moving the front curtain and the rear curtain of the focal plane shutter one after another with a predetermined period of time in between to perform an exposure; and capturing an image.

In the opening of the focal plane shutter, the cam may support the rear curtain so that the rear curtain is maintained in a raised state.

In the closing of the focal plane shutter, while the cam is rotating, the cam may support the rear curtain so that the rear curtain is maintained in a raised state, and simultaneously rotate the front curtain so that the front curtain is independently raised toward the rear curtain.

Between the closing of the focal plane shutter and the moving of the front curtain and the rear curtain, the method may further include: flowing electrical current to the front curtain magnet and the rear curtain magnet; rotating the cam so that the cam moves away from the front curtain and the rear curtain; and turning off the front curtain magnet and the rear curtain magnet one after another with a predetermined period of time in between.

The opening of the focal plane shutter, the closing of the focal plane shutter, the moving of the front curtain and the rear curtain, and the photographing of the image may be repeatedly performed.

Between the photographing of the image and the opening of the focal plane shutter, the method may further include rotating the cam so that the front curtain is maintained at a lowered state while simultaneously raising the rear curtain independently from the front curtain.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
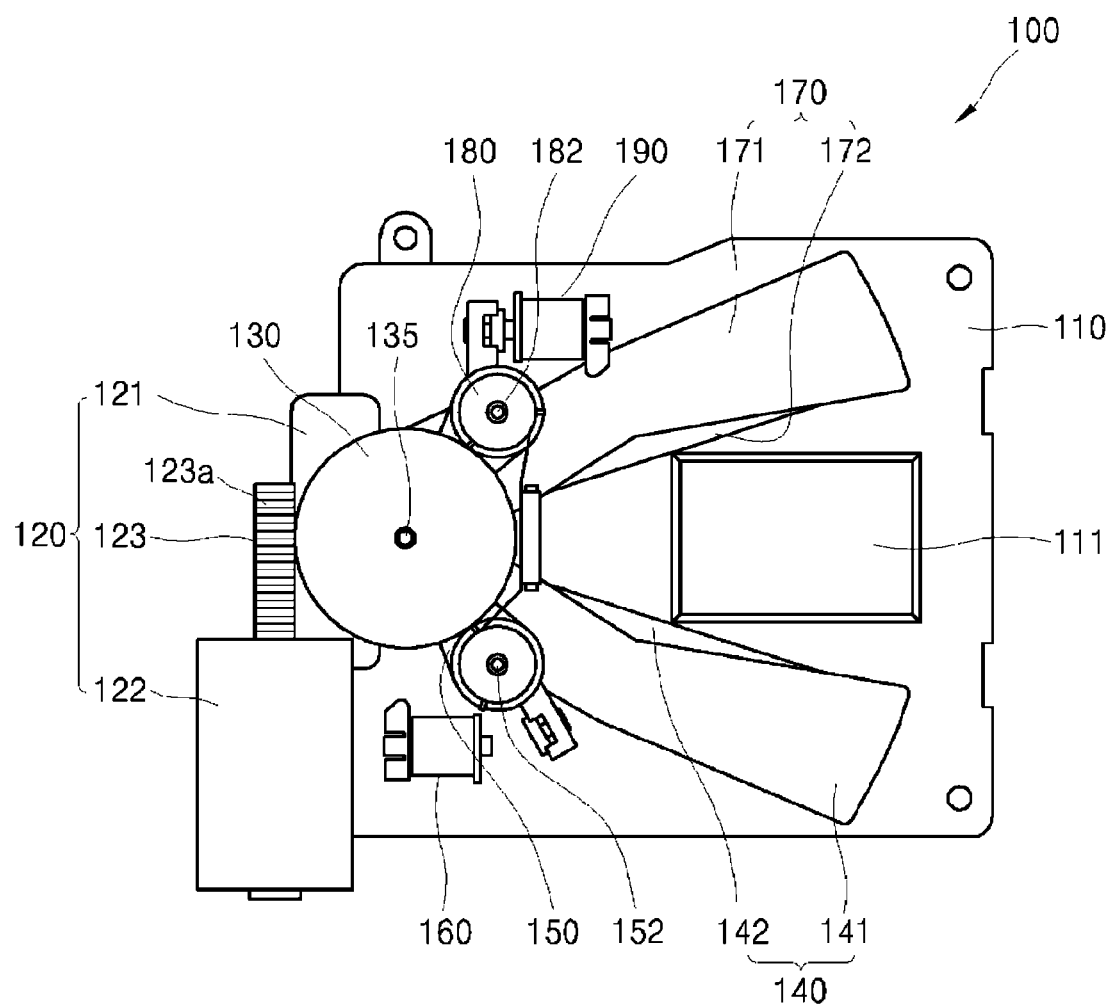
FIG. 1 is a schematic view illustrating an example structure of a focal plane shutter according to an embodiment of the present invention.

FIG. 1 is a schematic view of an example of a focal plane shutter 100 according to an embodiment of the present invention.

In general, a focal plane shutter is a shutter in which two cloths or metal curtains installed in front of a focal surface of a lens horizontally or vertically move, and allows a photosensitive material to be exposed to a proper amount of light by controlling an opening between a front curtain and a rear curtain or the speed of travel of the front curtain and the rear curtain. Focal plane shutters are widely used in lens-interchangeable cameras.

Such focal plane shutters are often used in cameras with a photosensitive material size of 6×6 cm or less. Focal plane shutters determine an exposure time by adjusting the width of a slit using a speed regulator or an electrically controlled electromagnet while maintaining the speed of a front or rear curtain constant. Focal plane shutters allow lens interchange to be made while allowing for easy and fast shuttering.

Referring to FIG. 1, the example of a focal plane shutter 100 includes a shutter base 110, a driving unit 120, a cam 130, a front curtain 140, a front curtain lever 150, a front curtain magnet 160, a rear curtain 170, a rear curtain lever 180, and a rear curtain magnet 190.

The shutter base 110 serves as a base of the focal plane shutter 100, and has the aforementioned components arranged on the shutter base 110. An aperture 111 is formed in a part of the shutter base 110, and an image pickup device (not shown) is disposed to a rear of the aperture 111. The aperture 111 is opened and closed by the front curtain 140 and the rear curtain 170.

The driving unit 120 includes a motor base 121, a motor 122, and a worm gear 123. The motor base 121 is disposed on the shutter base 110 and serves as the base of the driving unit 120, and the motor 122 and the worm gear 123 are disposed on the driving unit 120. The motor 122 generates a driving force to rotate the cam 130. A worm gear 123 is a worm drive and is used when two shafts are perpendicular to each other. The worm gear 123 denotes a pair of a worm with one or several spirals and a worm wheel which has teeth and engages with the worm. The worm wheel is similar to a helical gear and accordingly has angled teeth which are moved by the spirals of the worm. In the present embodiment, one or several spirals 123a are formed on an outer circumference of the worm gear 123, and grooves 136 (see FIG. 2) are formed at regular intervals on the cam 130. The worm gear 123 is coupled with a rotation shaft of the motor 122 and transmits a driving force generated by the motor 122 to the cam 130, thus converting the driving force of the motor 122 into a force to rotate the cam 130.

As described above, the focal plane shutter 100 uses a simple worm gear instead of using a complicated gear train used in the prior art, and thus has a simple structure and is easily controlled.

The cam 130 is disposed on the shutter base 110 and formed so as to be rotatable about a cam shaft 135. As described above, the grooves 136 (see FIG. 2) are formed on the outer circumference of the cam 130 to engage with the worm gear 123, and thus can be rotated by the driving force provided by the motor 122. Since a front curtain control unit 132 (see FIG. 2) and a rear curtain control unit 133 (see FIG. 2) are formed on a rear surface of the cam 130, movements of a front curtain 140 and a rear curtain 170 are controlled according to the rotation of the cam 130. A relation between the cam 130 and the front and rear curtains 140 and 170 will be described later in greater detail.

The front curtain 140 and the rear curtain 170 are cloths or metal curtains that are disposed parallel to each other, and move relative to each other to expose or conceal an aperture 111. That is, when the front curtain 140 and the rear curtain 170 are proximate to each other and there is no gap therebetween, the aperture 111 is concealed or closed. When a gap is formed between the front curtain 140 and the rear curtain 170, the aperture 111 is exposed or opened.

The front curtain 140 includes two wings, namely, a first front curtain 141 and a second front curtain 142, and the rear curtain 170 includes two wings, namely, a first rear curtain 171 and a second rear curtain 172. Although each of the front curtain 140 and the rear curtain 170 illustrated in FIG. 1 includes two wings, the present invention is not limited thereto, and the number and shapes of the wings may vary according to sizes, locations, shapes, etc. of a shutter and an aperture. As described above, each of the front curtain 140 and the rear curtain 170 includes only wings, more specifically, two or more wings, so that a shutter curtain structure can be simple.

Although the front curtain 140 and the rear curtain 170 are shown in FIG. 1 as being arranged above/below each other, the present embodiment is not limited to vertically-aligned curtains. That is, the front curtain 140 and the rear curtain 170 may be arranged laterally adjacent to each other, i.e. side by side. However, since a vertical travel shutter having a front curtain and a rear curtain arranged above/below each other has to travel a shorter side of a screen (e.g. an image pickup device) than a horizontal travel shutter having to travel a longer side, the vertical travel shutter can have a shorter travel time and a higher shutter speed. To this end, a vertical travel shutter in which the front curtain 140 and the rear curtain 170 are arranged above/below each other will be explained hereinafter.

The front curtain lever 150 is disposed on the shutter base 110, and is rotatable about a front curtain lever shaft 152. The front curtain lever 150 is located between the cam 130 and the front curtain 140 and transmits a rotation force of the cam 130 to the front curtain 140 so that the front curtain 140 can rotate according to the rotation of the cam 130. This relationship between the cam 130, the front curtain 140, and the front curtain lever 150 will be described later in greater detail.

The rear curtain lever 180 is disposed on the shutter base 110, and is rotatable about a rear curtain lever shaft 182. The rear curtain lever 180 is located between the cam 130 and the rear curtain 170, and transmits a rotation force of the cam 130 to the rear curtain 170 so that the rear curtain 170 can rotate according to the rotation of the cam 130. This relationship among the cam 130, the rear curtain 170, and the rear curtain lever 180 will be described later in greater detail.

A front curtain magnet 160 is formed on one side of the front curtain lever 150, and a rear curtain magnet 190 is formed on one side of the rear curtain lever 180. When electric current flows through the front and rear curtain magnets 160 and 190, the front and rear curtain magnets 160 and 190 have predetermined magnetic forces and act as electromagnets. When the front and rear curtain magnets 160 and 190 act as electromagnets, the magnetic forces provided by the front and rear curtain magnets 160 and 190 cause positions of the front and rear curtain levers 150 and 180 to be fixed, and the position of the front and rear curtains 140 and 170 is fixed to avoid them moving under their own weight.

A shape of the cam 130 of the focal plane shutter 100 will now be described.

Figure 2:
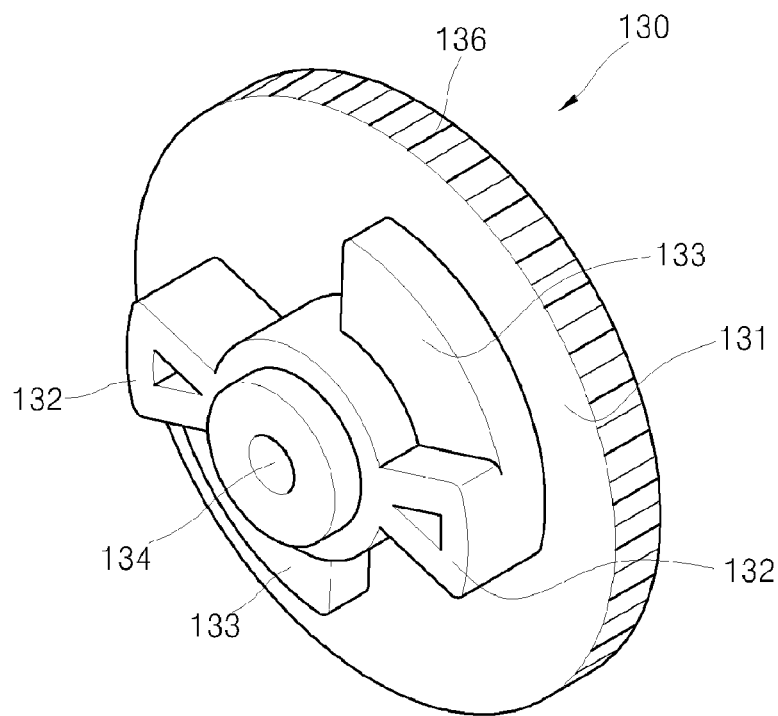
FIG. 2 is a rear side perspective view of an example of a cam of the focal plane shutter illustrated in FIG. 1.
Figure 3:
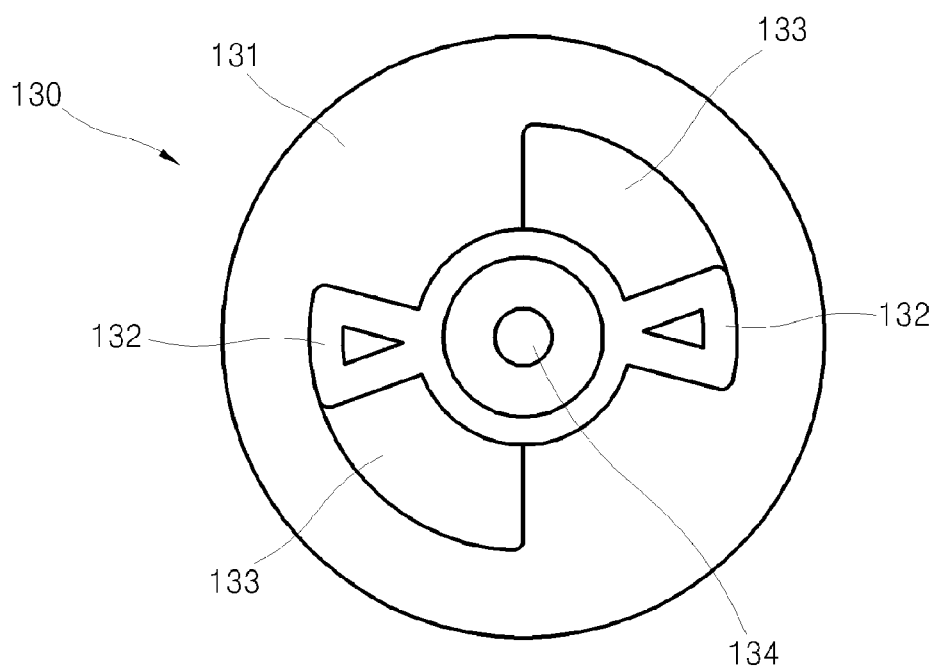
FIG. 3 is a rear side view of the cam of the focal plane shutter illustrated in FIG. 1.

FIG. 2 is a rear side perspective view of the cam 130 of FIG. 1, and FIG. 3 is a rear side view of the cam 130 of FIG. 1.

Referring to FIGS. 2 and 3, the cam 130 of the focal plane shutter 100 includes a base plate 131, a front curtain control unit 132, and a rear curtain control unit 133. As described above, a hole 134 is formed on an approximately center portion of the cam 130, and the cam shaft 135 (see FIG. 1) is inserted through the hole 134. Accordingly, the cam 130 is rotatable about the cam shaft 135. The cam 130 controls relative movements of the front curtain 140 and the rear curtain 170.

In more detail, the base plate 131 is formed in the shape of a flat circular plate, and the grooves 136 are formed at regular intervals on the outer circumference of the circular base plate 131. The grooves 136 engage with the spirals 123a (see FIG. 1) of the worm gear 123 (see FIG. 1) and convert the driving force of the motor 122 (see FIG. 1) into a rotation of the cam 130.

A rear curtain control unit 133 having a fan shape of a predetermined angle is formed on the base plate 131. A front curtain control unit 132 having a fan shape with a predetermined angle is formed on the rear curtain control unit 133. In other words, the front curtain control unit 132 and the rear curtain control unit 133 constitute a step on the base plate 131.

The front curtain control unit 132 and the rear curtain control unit 133 are formed to have radiuses smaller than that of the base plate 131. The front curtain control unit 132 and the rear curtain control unit 133 may have approximately the same radius, but the present invention is not limited thereto. In other words, if the front curtain control unit 132 and the rear curtain control unit 133 are formed to independently control the front curtain 140 and the rear curtain 170, respectively, the radiuses of the front curtain control unit 132 and the rear curtain control unit 133 may be set differently.

Although the central angle of the rear curtain control unit 133 is shown in FIGS. 2 and 3 as being larger than that of the front curtain control unit 132, the present invention is not limited thereto. In other words, if the front curtain control unit 132 and the rear curtain control unit 133 are formed to independently control the front curtain 140 and the rear curtain 170, independently, the radiuses of the front curtain control unit 132 and the rear curtain control unit 133 may be set differently. However, according to the characteristics of the focal plane shutter 100, the rear curtain 170 is fixed in an ascended state for a long time, whereas the front curtain 140 ascends only occasionally. Thus, it may be general that the central angle of the rear curtain control unit 133 for fixing the rear curtain 170 at an ascended state is set to be larger than that of the front curtain control unit 132 for fixing the front curtain 140 at a descended state.

As illustrated in FIGS. 2 and 3, the front curtain control unit 132 and the rear curtain control unit 133 constitute a step and thus can independently control the front curtain 140 and the rear curtain 170 to move relative to each other to expose or conceal the aperture 111. Since the relative movement between the front curtain 140 and the rear curtain 170 can be controlled by only using the single cam 130 as described above, the focal plane shutter 100 has a simple structure and is easily manufactured as compared with a conventional focal plane shutter.

Although not shown in FIGS. 2 and 3, a contact switch may be further formed on one surface of the cam 130 and may control the amount of rotation of the cam 130.

Structures of the cam 130 and the front curtain lever 150 of the focal plane shutter 100 will now be described in detail.

Figure 4:
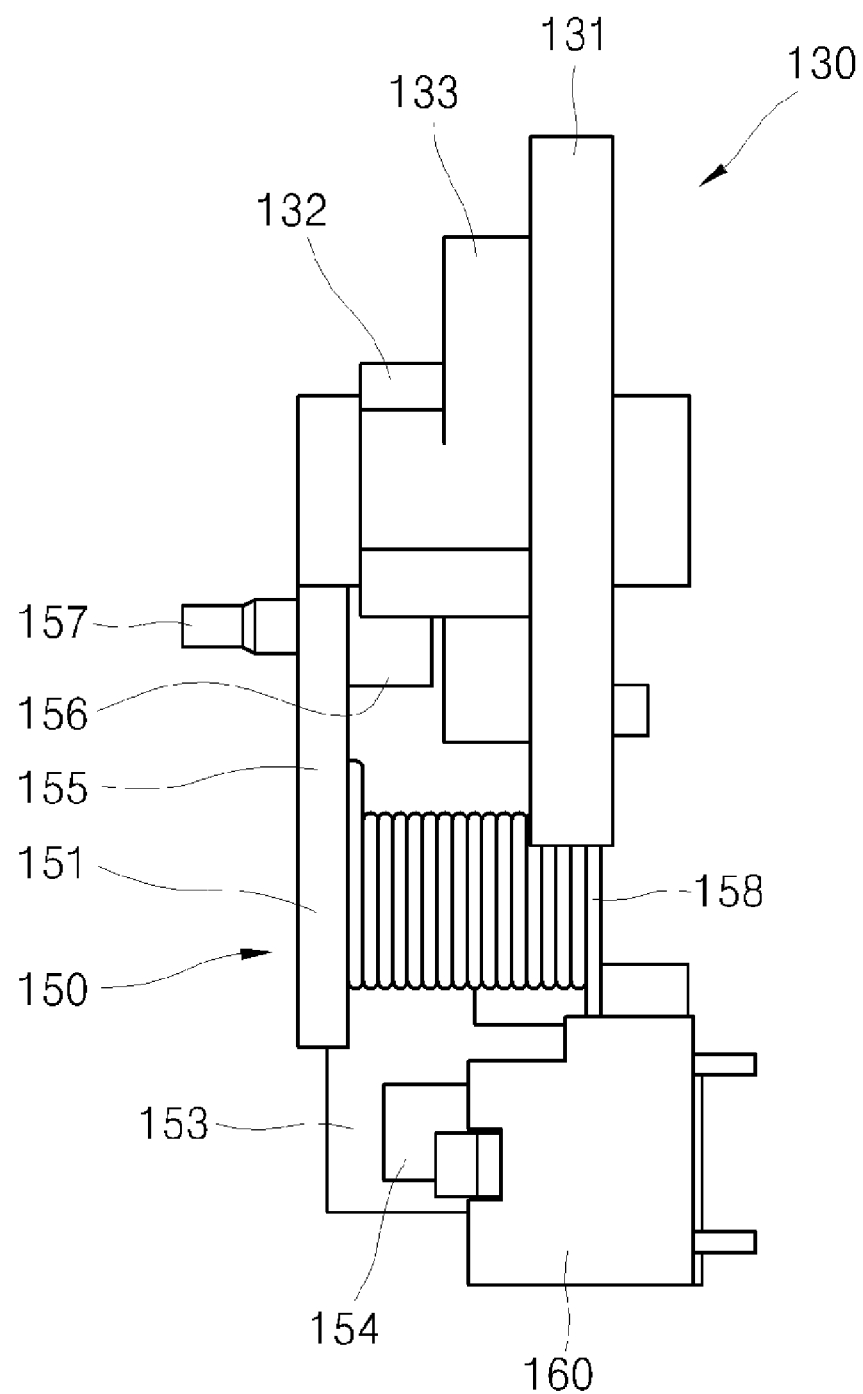
FIG. 4 is a left lateral side view of the cam, a front curtain lever, and a front curtain magnet of the focal plane shutter illustrated in FIG. 1.
Figure 5:
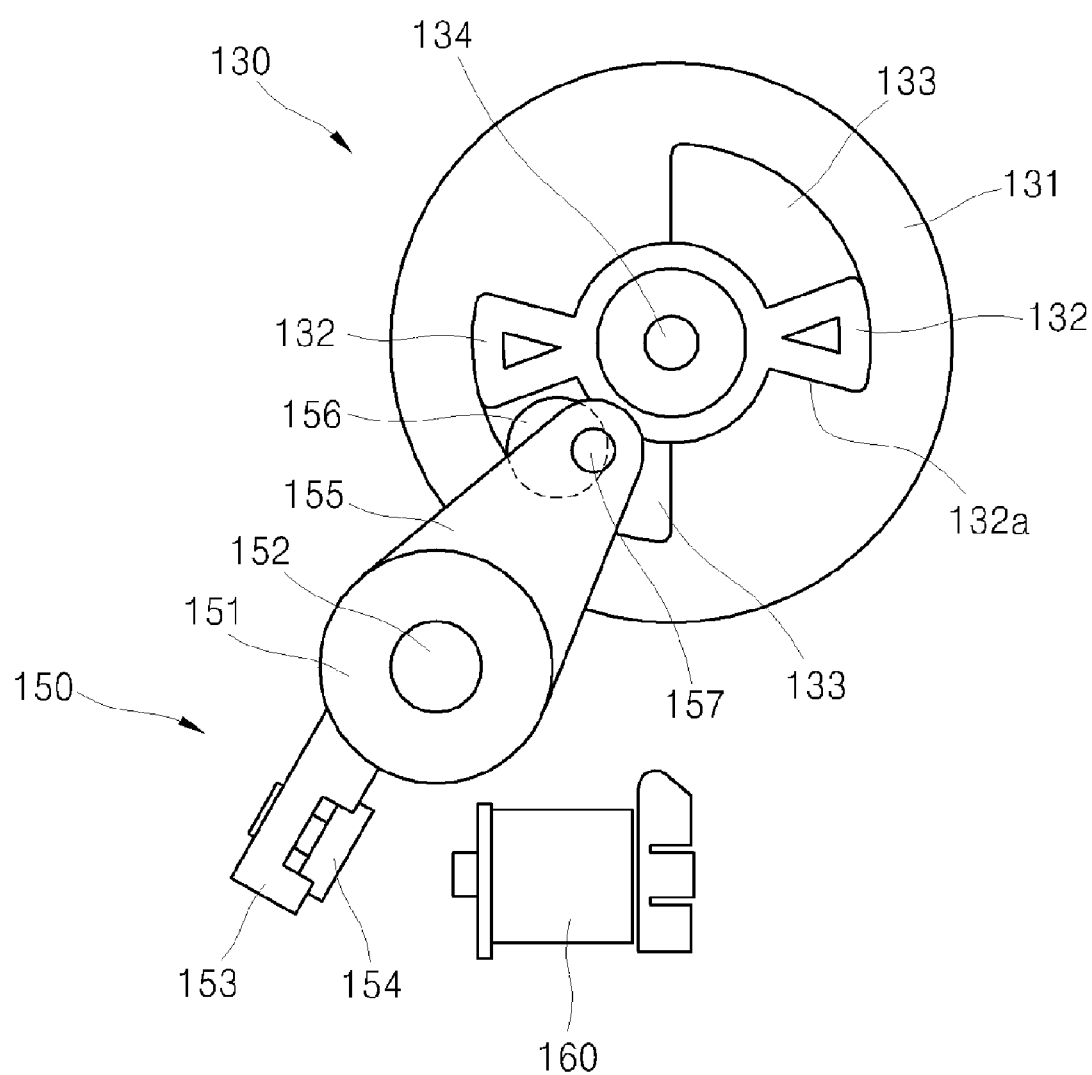
FIG. 5 is a rear side view of the cam, the front curtain lever, and the front curtain magnet of the focal plane shutter illustrated in FIG. 1.

FIG. 4 is a left lateral side view of the cam 130, the front curtain lever 150, and the front curtain magnet 160 of FIG. 1. FIG. 5 is a rear side view of the cam 130, the front curtain lever 150, and the front curtain magnet 160 of FIG. 1.

Referring to FIGS. 4 and 5, the front curtain lever 150 of the focal plane shutter 100 includes a base 151 in a flat circular plate shape, a front curtain lever shaft 152, a first end 153, a magnetic body 154, a second end 155, a cam roller 156, a front curtain pin 157, and a front curtain spring 158. The front curtain lever 150 is disposed between the cam 130 and the front curtain 140 and transmits the rotation force of the cam 130 to the front curtain 140 so that the front curtain 140 may rotate according to the rotation of the cam 130.

More specifically, the front curtain lever 150 is disposed on one side of the cam 130 on the shutter base 110 and is formed to be rotatable about the front curtain lever shaft 152. In other words, the base 151 and the first and second ends 153 and 155 extending in different directions from the base 151 are formed to be rotatable about the front curtain lever shaft 152.

The front curtain spring 158 may be further formed on the front curtain lever shaft 152 and may continuously provide a predetermined elastic force to the front curtain lever 150 so that the front curtain lever 150 may rotate about the front curtain lever shaft 152 in one direction. For example, the front curtain spring 158 may provide the predetermined elastic force to the front curtain lever 150 so that the front curtain lever 150 can rotate clockwise as viewed from FIG. 5. Accordingly, in all cases except for the case where the front curtain lever 150 is supported by the front curtain control unit 132 of the cam 130 or fixed by the front curtain magnet 160, the front curtain lever 150 receives the elastic force so as to rotate clockwise, that is, in a direction in which the front curtain lever 150 moves away from the front curtain magnet 160.

The first end 153 extends toward a side of the base 151 approximately opposite to the cam 130, that is, toward the front curtain magnet 160. A magnetic body 154 is installed on one side of the first end 153. Accordingly, when electric current flows through the front curtain magnet 160, the front curtain magnet 160 has a predetermined magnetic force and acts as an electromagnet, and the magnetic body 154 is magnetically coupled with the front curtain magnet 160 which acts as an electromagnet. Accordingly, the position of the front curtain 140 can be fixed instead of lowering by its own weight.

The second end 155 extends toward a side of the base 151 where the cam 130 exists. A cam roller 156 is installed on one side of the second end 155. As illustrated in FIGS. 4 and 5, the cam roller 156 has a cylindrical shape, and is formed so that an outer circumference thereof can contact an outer circumference of the front curtain control unit 132 in the fan shape. In other words, the cam roller 156 may be formed so as to contact only the front curtain control unit 132 from among the front and rear curtain control units 132 and 133, which form a step. Due to this structure, the front curtain lever 150 may be controlled by the front curtain control unit 132.

A front curtain pin 157 may also be formed on the second end 155 and inserted into guide grooves 141a and 142a (see FIG. 9) of the front curtain 140. Accordingly, when the motor 122 rotates, the cam 130 rotates accordingly. When the cam 130 rotates, the front curtain lever 150 rotates accordingly. When the front curtain lever 150 rotates, the front curtain 140 may rotate together. An operational relationship between the front curtain lever 150 and the front curtain 140 will be described later in greater detail.

Operations of the cam 130 and the front curtain lever 150 of the focal plane shutter 100 will now be described in detail.

Figure 6:
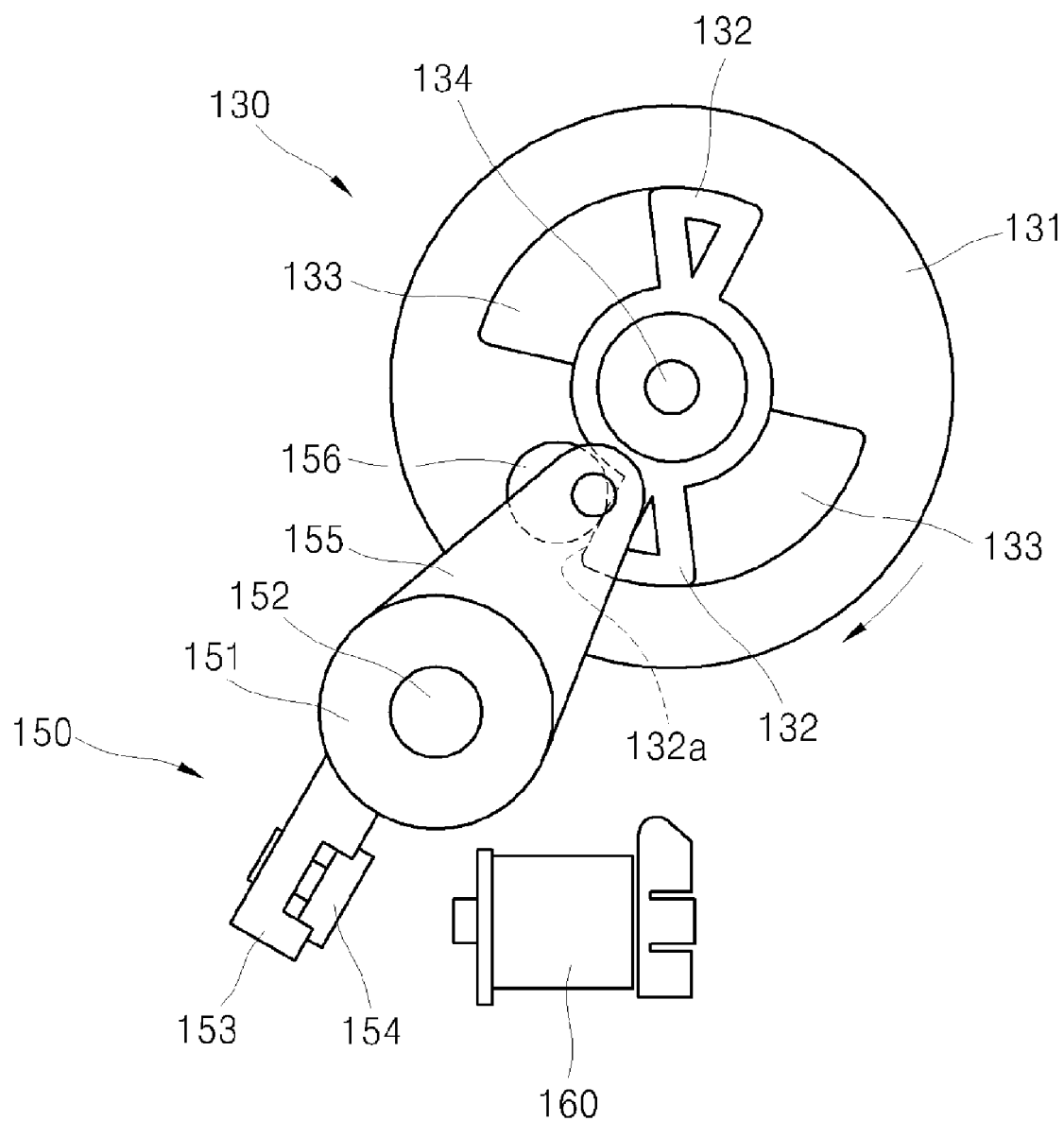
FIGS. 6 and 7 illustrate example movements of the cam and the front curtain lever of the focal plane shutter illustrated in FIG. 1.
Figure 7:
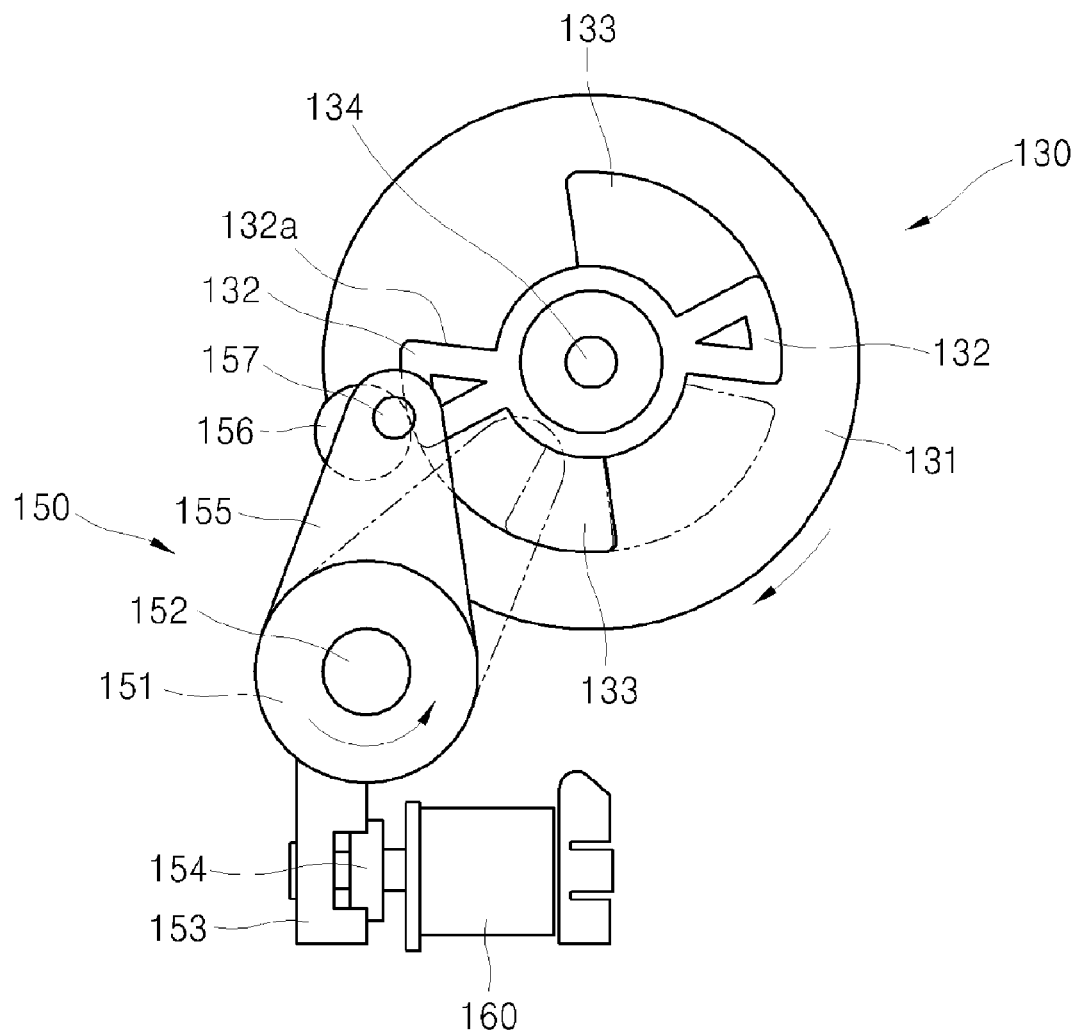

FIGS. 5 through 7 are rear views illustrating examples of mutual movements of the cam 130 and the front curtain lever 150 of the focal plane shutter 100 of FIG. 1.

FIG. 5 illustrates a state where the cam roller 156 of the front curtain lever 150 does not contact the front curtain control unit 132 of the cam 130. As described above, in this state, the front curtain spring 158 provides a predetermined elastic force to the front curtain lever 150 so that the front curtain lever 150 may rotate clockwise when viewed from FIG. 5. Accordingly, the front curtain lever 150 is located a certain distance apart from the front curtain magnet 160.

In the state of FIG. 5, when the motor 122 operates, the cam 130 rotates clockwise when viewed from FIG. 5. FIG. 6 illustrates a state where the cam 130 has been rotated until one side 132a of the front curtain control unit 132 of the cam 130 contacts the cam roller 156. In this state, the front curtain control unit 132 does not apply any significant force to the cam roller 156.

In the state of FIG. 6, when the motor 122 operates for a prolonged period (hereinafter referred to as "continuously operates"), the cam 130 continuously rotates clockwise. Then, the front curtain control unit 132 of the cam 130 pushes up the cam roller 156 while rotating, and thus the front curtain lever 150 is rotated counterclockwise about the front curtain lever shaft 152. In this state, when the motor 122 continuously operates and thus the cam 130 continuously rotates clockwise, the cam roller 156 is located at an arc of the front curtain control unit 132 as illustrated in FIG. 7. In this state, the magnetic body 154 installed on the first end 153 of the front curtain lever 150 contacts the front curtain magnet 160.

In the state of FIG. 7, when the motor 122 continuously operates, the cam 130 continuously rotates clockwise. Then, when the arc of the front curtain control unit 132 rotates and reaches a location where the arc no longer supports the cam roller 156, the front curtain lever 150 is rotated clockwise by the predetermined elastic force provided by the front curtain spring 158, and returns to the state of FIG. 5.

As described above, while the cam 130 is rotating, the position of the front curtain lever 150 is controlled according to whether the front curtain control unit 132 contacts and supports the cam roller 156, and the position of the front curtain 140 is controlled according to the position of the front curtain lever 150. In other words, while the cam roller 156 is in contact with the arc of the front curtain control unit 132, the front curtain lever 150 is supported by the cam 130 as illustrated in FIG. 7, and the magnetic body 154 of the front curtain lever 150 comes into contact with the front curtain magnet 160 (this state is called a charge state). On the other hand, while the cam roller 156 is out of contact with the arc of the front curtain control unit 132, the front curtain lever 150 is not supported by the cam 130 as illustrated in FIG. 5, and the magnetic body 154 of the front curtain lever 150 is separated from the front curtain magnet 160 (this state is called a free state).

Structures and operations of the cam 130, the front curtain 140, and the front curtain lever 150 of the focal plane shutter 100 will now be described.

Figure 8:
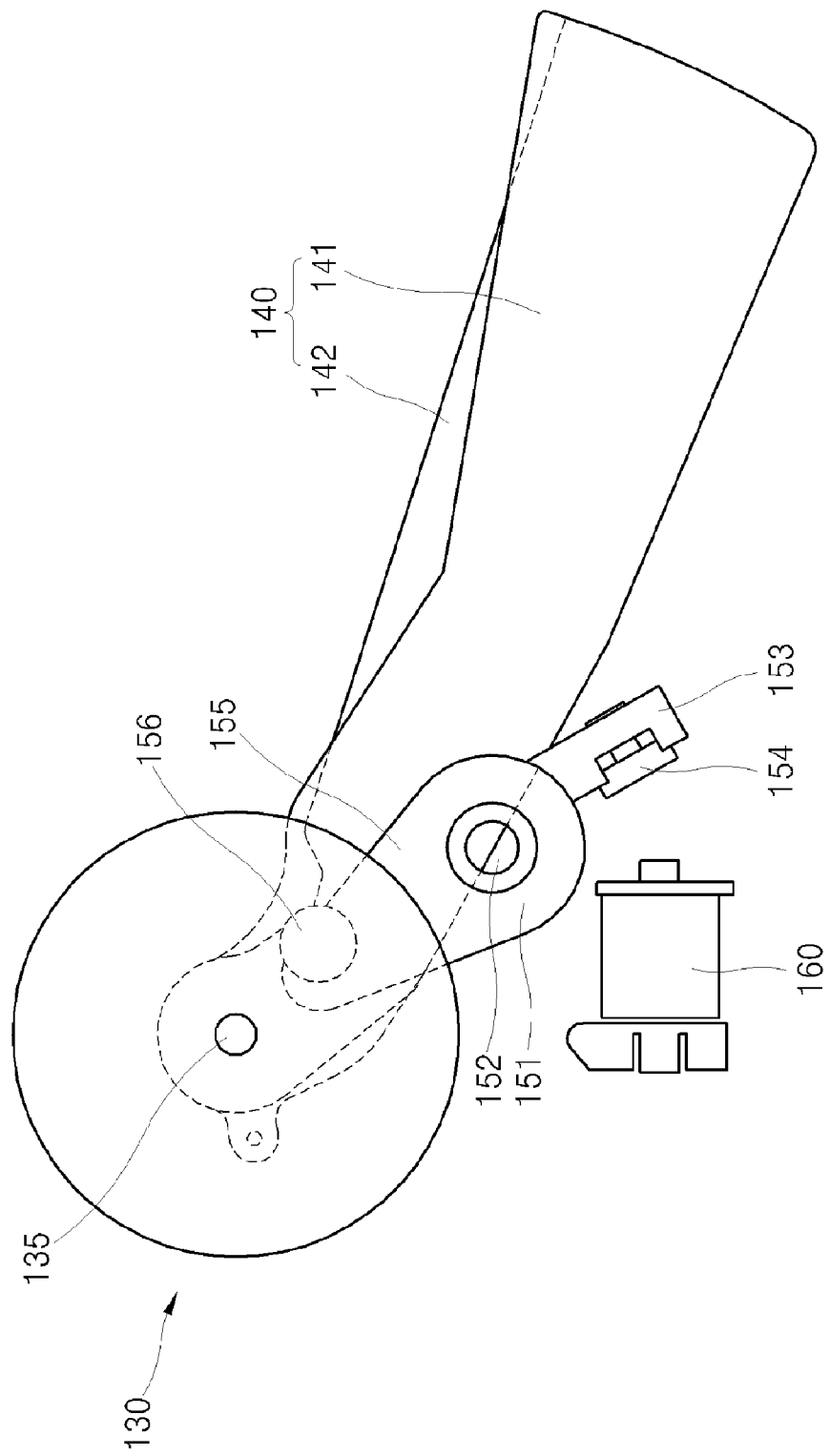
FIG. 8 is a front side view of the cam, a front curtain, and the front curtain lever of the focal plane shutter illustrated in FIG. 1.
Figure 9:
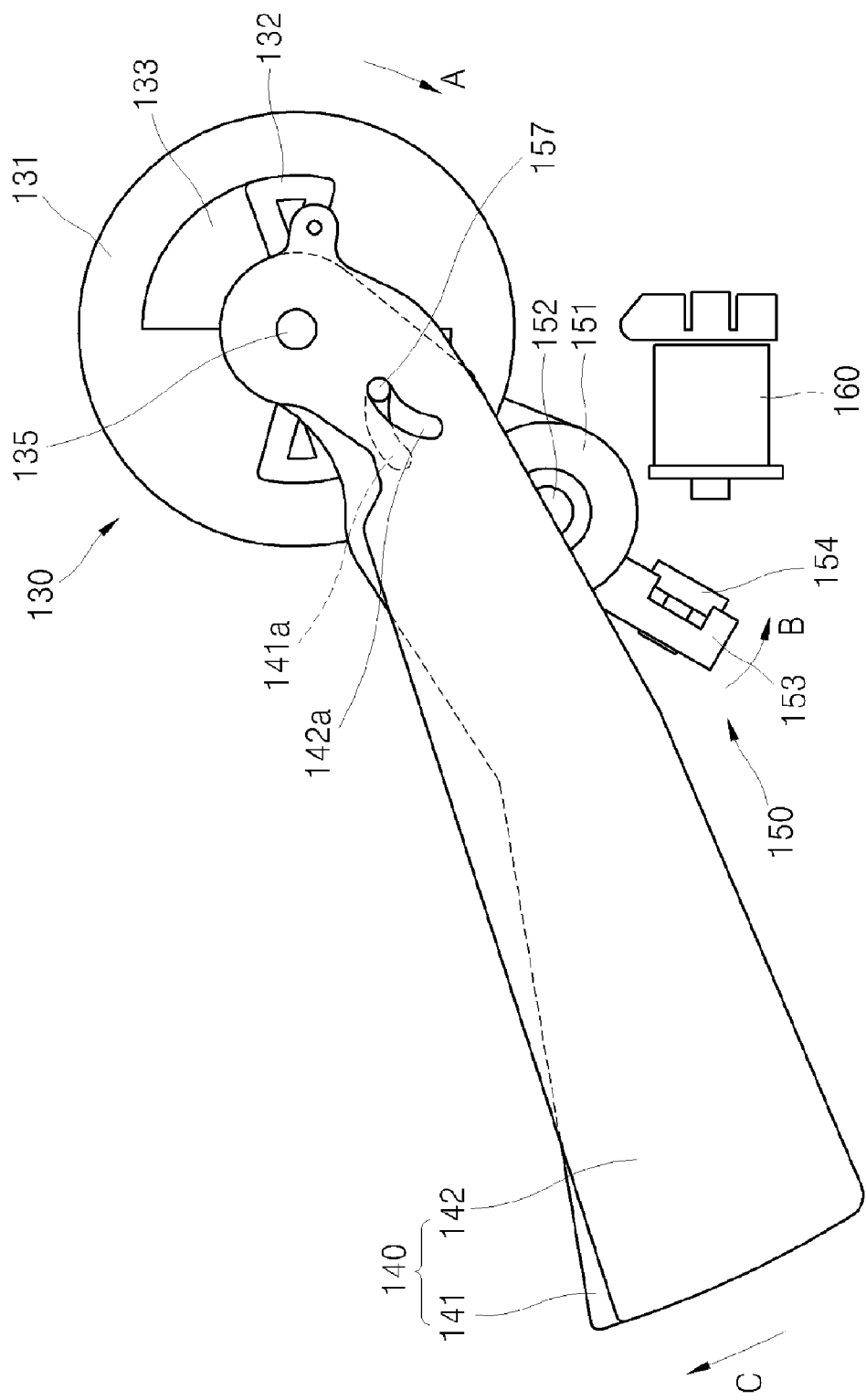
FIG. 9 is a rear side view of the cam, the front curtain, and the front curtain lever of the focal plane shutter illustrated in FIG. 1.

FIG. 8 is a front side view of the cam 130, the front curtain 140, and the front curtain lever 150 of FIG. 1. FIG. 9 is a rear side view of the cam 130, the front curtain 140, and the front curtain lever 150 of FIG. 1.

Referring to FIGS. 8 and 9, a hole is formed in one end of the first front curtain 141, a hole is formed in one end of the second front curtain 142, and the curtains 141 and 142 are fit onto the cam shaft 135 by way of the holes. Accordingly, the first front curtain 141 and the second front curtain 142 are rotatable about the cam shaft 135.

A first front curtain guide hole 141a is formed in the first front curtain 141, and a second front curtain guide hole 142a is formed in the second front curtain 142. The first front curtain guide hole 141a and the second front curtain guide hole 142a are formed at a location corresponding to the front curtain pin 157 of the front curtain lever 150. Accordingly, when the first front curtain 141 and the second front curtain 142 are fit onto the cam shaft 135, the first front curtain guide hole 141a and the second front curtain guide hole 142a may be fit onto the front curtain pin 157.

In other words, in the state of FIG. 9, when the cam 130 rotates in a direction indicated by arrow A, the front curtain control unit 132 of the cam 130 pushes up the front curtain lever 150 as described above, and thus the front curtain lever 150 rotates in a direction indicated by arrow B. When the front curtain lever 150 rotates in the direction indicated by arrow B, the front curtain pin 157 moves along the first front curtain guide hole 141a and the second front curtain guide hole 142a as described above, and thus the first front curtain 141 and the second front curtain 142 rotate in a direction indicated by arrow C.

Although not shown in FIG. 9, when the cam 130 further rotates in the direction indicated by arrow A and thus the cam roller 156 no longer contacts the arc of the front curtain control unit 132, a force supporting the front curtain lever 150 disappears, and thus the front curtain lever 150 is rotated in a direction opposite to a direction indicated by arrow B by the elastic force provided by the front curtain spring 158. Accordingly, the front curtain pin 157 is moved in a direction opposite to the previously described direction along the first front curtain guide hole 141a and the second front curtain guide hole 142a, and thus the first front curtain 141 and the second front curtain 142 rotate in a direction opposite to the direction indicated by arrow C.

As described above, while the cam 130 is rotating in one direction, the front curtain 140 repeats movements to expose and conceal the aperture 111, and thus the movements of the front curtain 140 to expose and conceal the aperture 111 can be controlled according to the amount of rotation of the cam 130.

Figure 10:
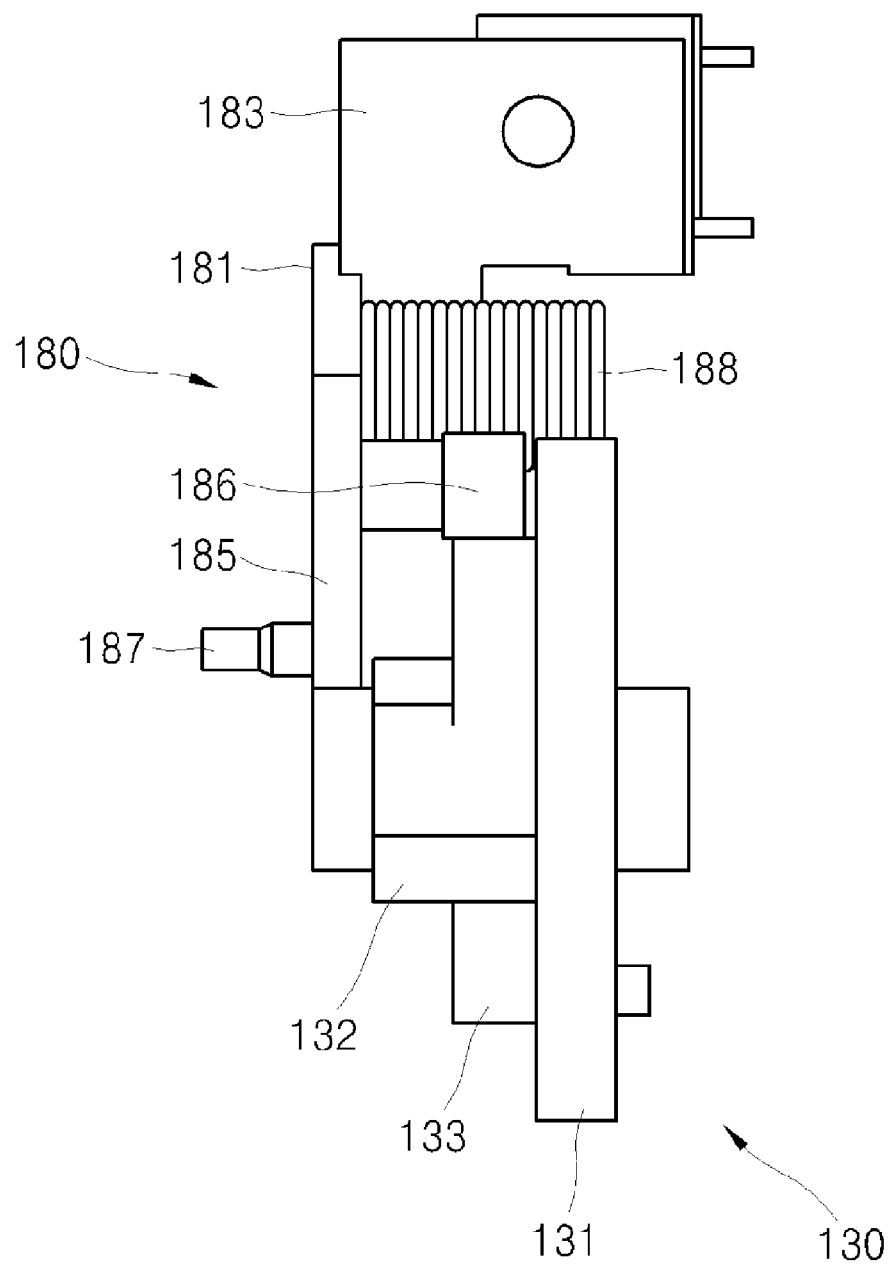
FIG. 10 is a left lateral side view of the cam, a rear curtain lever, and a rear curtain magnet of the focal plane shutter illustrated in FIG. 1.
Figure 11:
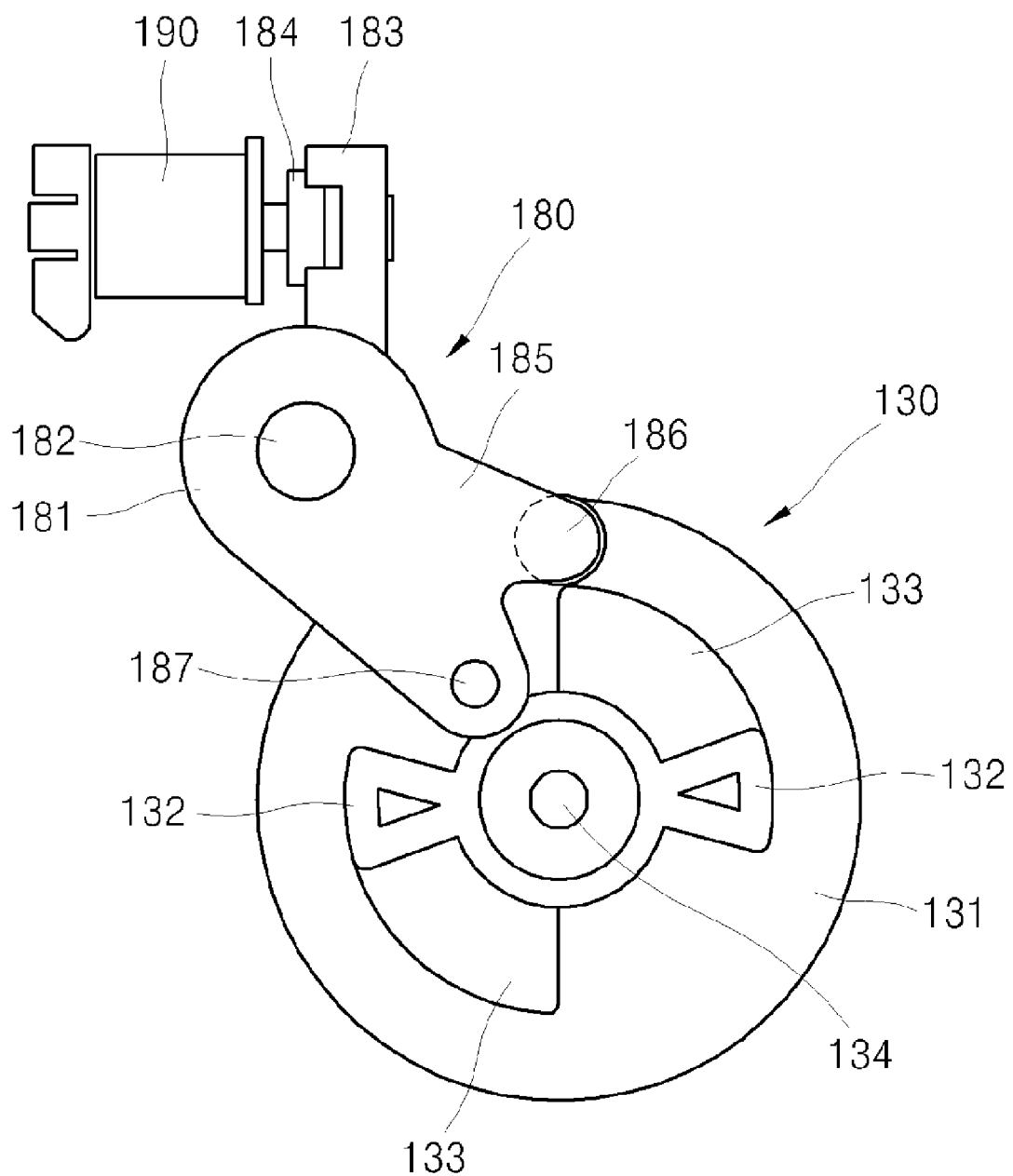
FIG. 11 is a rear side view of the cam, the rear curtain lever, and the rear curtain magnet of the focal plane shutter illustrated in FIG. 1.

FIG. 10 is a left lateral side view of the cam 130, a rear curtain lever 180, and a rear curtain magnet 190 of FIG. 1. FIG. 11 is a rear side view of the cam 130, the rear curtain lever 180, and the rear curtain magnet 190 of FIG. 1.

Referring to FIGS. 10 and 11, the rear curtain lever 180 of the focal plane shutter 100 includes a base 181 in a flat circular plate shape, a rear curtain lever shaft 182, a first end 183, a magnetic body 184, a second end 185, a cam roller 186, a rear curtain pin 187, and a rear curtain spring 188. The rear curtain lever 180 is disposed between the cam 130 and the rear curtain 170 and transmits a rotating force of the cam 130 to the rear curtain 170 so that the rear curtain 170 can rotate according to a rotation of the cam 130.

More specifically, the rear curtain lever 180 is installed on one side of the cam 130 on the shutter base 110 and formed to be rotatable about the rear curtain lever shaft 182. In other words, the base 181 and the first and second ends 183 and 185 extending in different directions from the base 181 are formed to be rotatable about the rear curtain lever shaft 182.

A rear curtain spring 188 may be further formed on the rear curtain lever shaft 182 and continuously provide a predetermined elastic force to the rear curtain lever 180 so that the rear curtain lever 180 can rotate in one direction about the rear curtain lever shaft 182. For example, the rear curtain spring 188 may provide the predetermined elastic force to the rear curtain lever 180 so that the rear curtain lever 180 can rotate clockwise when viewed from FIG. 11. Accordingly, in all cases except for the case where the rear curtain lever 180 is supported by the rear curtain control unit 133 of the cam 130 or fixed by the rear curtain magnet 190, the rear curtain lever 180 receives an elastic force so as to rotate clockwise, that is, in a direction where the rear curtain level 180 moves away from the rear curtain magnet 190.

The first end 183 extends toward a side of the base 181 approximately opposite to the cam 130, that is, toward the rear curtain magnet 190. A magnetic body 184 is installed on one side of the first end 183. Accordingly, when electric current flows through the rear curtain magnet 190, the rear curtain magnet 190 has a predetermined magnetic force and acts as an electromagnet, and the magnetic body 184 is magnetically coupled with the rear curtain magnet 190 which acts as an electromagnet. Accordingly, the position of the rear curtain 170 can be fixed instead of lowering by its own weight.

The second end 185 extends toward a side of the base 181 where the cam 130 exists. A cam roller 186 is installed on one side of the second end 185. As illustrated in FIGS. 10 and 11, the cam roller 186 has a cylindrical shape, and is formed so that an outer circumference thereof can contact an outer circumference of the rear curtain control unit 122 in the fan shape. In other words, the cam roller 186 may be formed so as to significantly contact only the rear curtain control unit 133 from among the front and rear curtain control units 132 and 133, which form a step. Due to this structure, the rear curtain lever 180 may be controlled by the rear curtain control unit 133.

A rear curtain pin 187 may also be formed on the second end 185 and inserted into guide grooves 171a and 172a (see FIG. 16) of the rear curtain 170. Accordingly, when the motor 122 rotates, the cam 130 rotates accordingly. When the cam 130 rotates, the rear curtain lever 180 rotates accordingly. When the rear curtain lever 180 rotates, the rear curtain 170 may rotate together. An operational relationship between the rear curtain lever 180 and the rear curtain 170 will be described later in greater detail.

Operations of the cam 130 and the rear curtain lever 180 of the focal plane shutter 100 will now be described in detail.

FIGS. 11 through and 13 are rear views illustrating examples of mutual movements of the cam 130 and the rear curtain lever 180 of the focal plane shutter 100 of FIG. 1.

FIG. 11 illustrates a state where the cam roller 186 of the rear curtain lever 180 contacts the rear curtain control unit 133 of the cam 130. In other words, since the rear curtain control unit 133 is in a state supporting the rear curtain lever 180, the rear curtain lever 180 is fixed and supported. In this state, the magnetic body 184 installed on the first end 183 of the rear curtain lever 180 contacts the rear curtain magnet 190.

In the state of FIG. 11, when the motor 122 operates, the cam 130 rotates clockwise. Then, when the arc of the rear curtain control unit 133 rotates and reaches a location where the arc no longer supports the cam roller 186, the rear curtain lever 180 is rotated clockwise by the predetermined elastic force provided by the rear curtain spring 188, and develops into the state of FIG. 12. Accordingly, the rear curtain lever 190 is located a certain distance apart from the rear curtain magnet 180.

Figure 12:
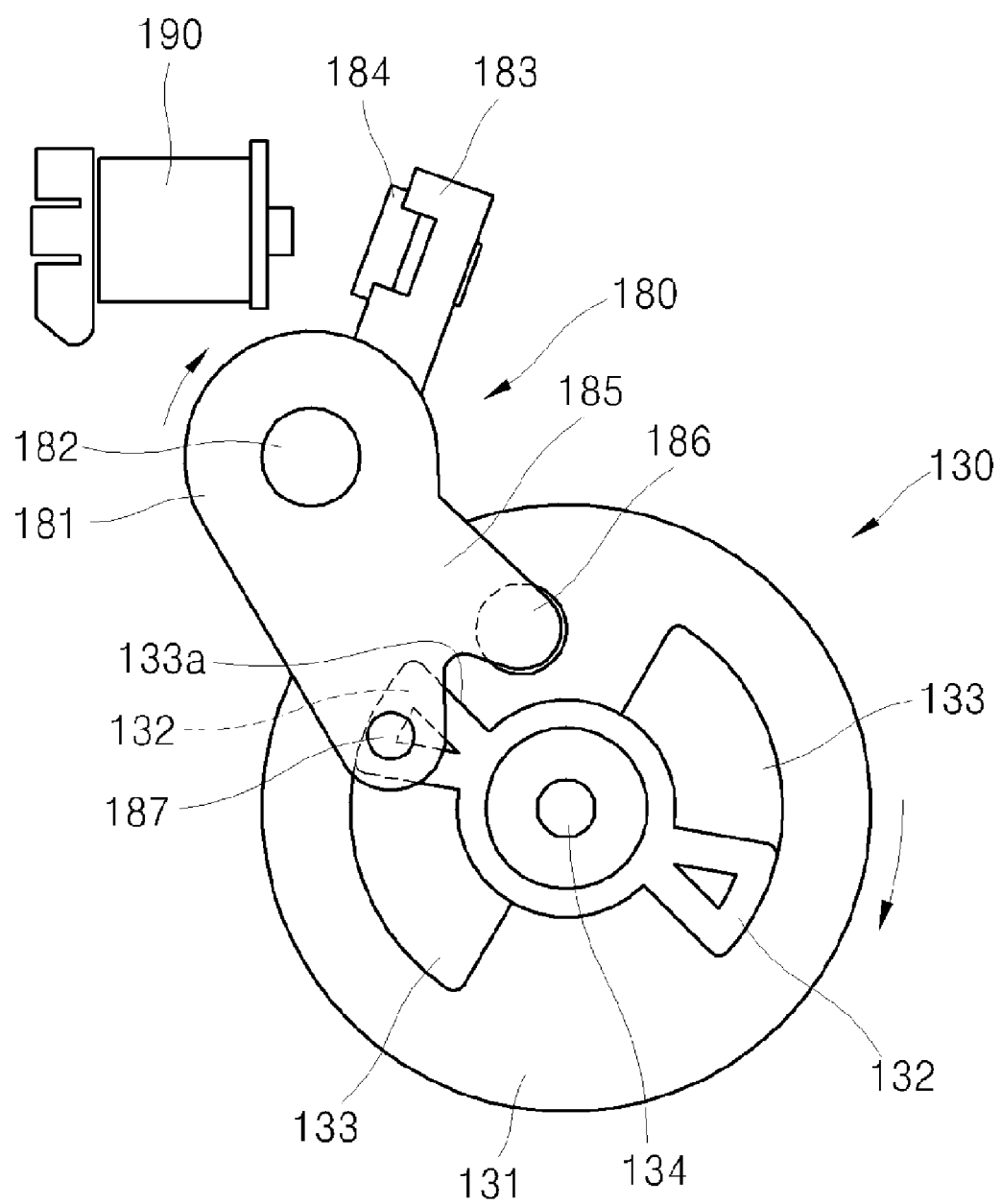
FIGS. 12 and 13 illustrate examples of movements of the cam and the rear curtain lever of the focal plane shutter illustrated in FIG. 1.
Figure 13:
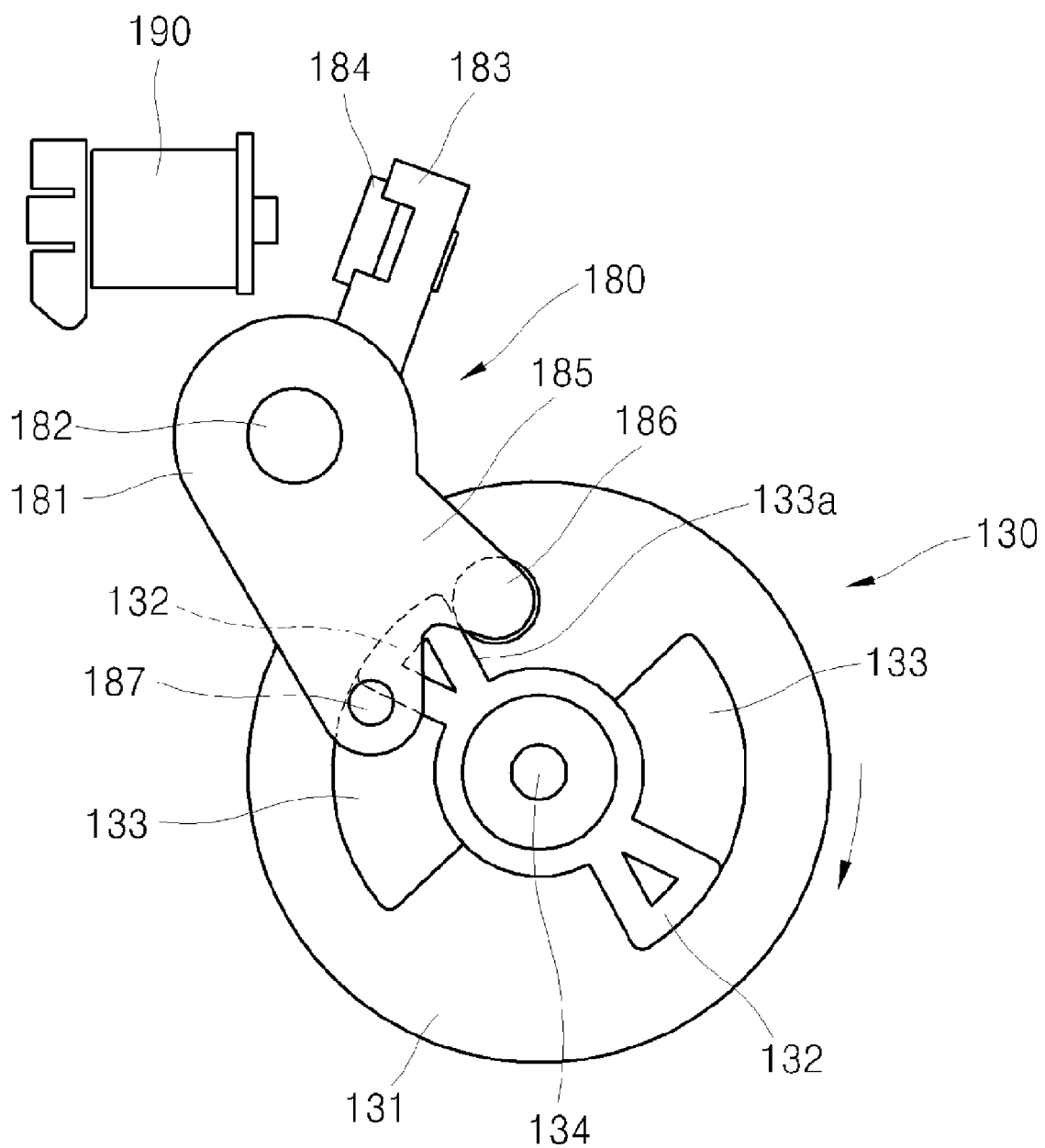

In the state of FIG. 12, when the motor 122 operates, the cam 130 rotates clockwise when viewed from FIG. 12. FIG. 13 illustrates a state where the cam 130 has been rotated until one side 133a of the rear curtain control unit 133 of the cam 130 contacts the cam roller 186. In this state, the rear curtain control unit 133 and the cam roller 186 only contact with each other, that is, the rear curtain control unit 133 does not apply any force to the cam roller 186.

In the state of FIG. 13, when the motor 122 operates for a prolonged period of time (hereinafter, "continuously operates"), the cam 130 continuously rotates clockwise. Then, the rear curtain control unit 133 of the cam 130 pushes up the cam roller 186 while rotating, and thus the rear curtain lever 180 is rotated counterclockwise about the rear curtain lever shaft 182. In this state, when the motor 122 continuously operates and thus the cam 130 continuously rotates clockwise, the cam roller 186 is located at an arc of the rear curtain control unit 133 and returns to the state of FIG. 11. In this state, the magnetic body 184 installed on the first end 183 of the rear curtain lever 180 contacts the rear curtain magnet 190.

As described above, while the cam 130 is rotating, the position of the rear curtain lever 180 is controlled according to whether the rear curtain control unit 133 contacts and supports the cam roller 186, and the position of the rear curtain 170 is controlled according to the position of the rear curtain lever 180. In other words, while the cam roller 186 is in contact with the arc of the rear curtain control unit 133, the rear curtain lever 180 is supported by the cam 130 as illustrated in FIG. 11, and the magnetic body 184 of the rear curtain lever 180 comes into contact with the rear curtain magnet 190 (this state is called a charge state). On the other hand, while the cam roller 186 is out of contact with the arc of the rear curtain control unit 133, the rear curtain lever 180 is not supported by the cam 130 as illustrated in FIGS. 12 and 13, and the magnetic body 184 of the rear curtain lever 180 is separated from the rear curtain magnet 190 (this state is called a free state).

Structures and operations of the cam 130, the rear curtain 170, and the rear curtain lever 180 of the focal plane shutter 100 will now be described.

Figure 14:
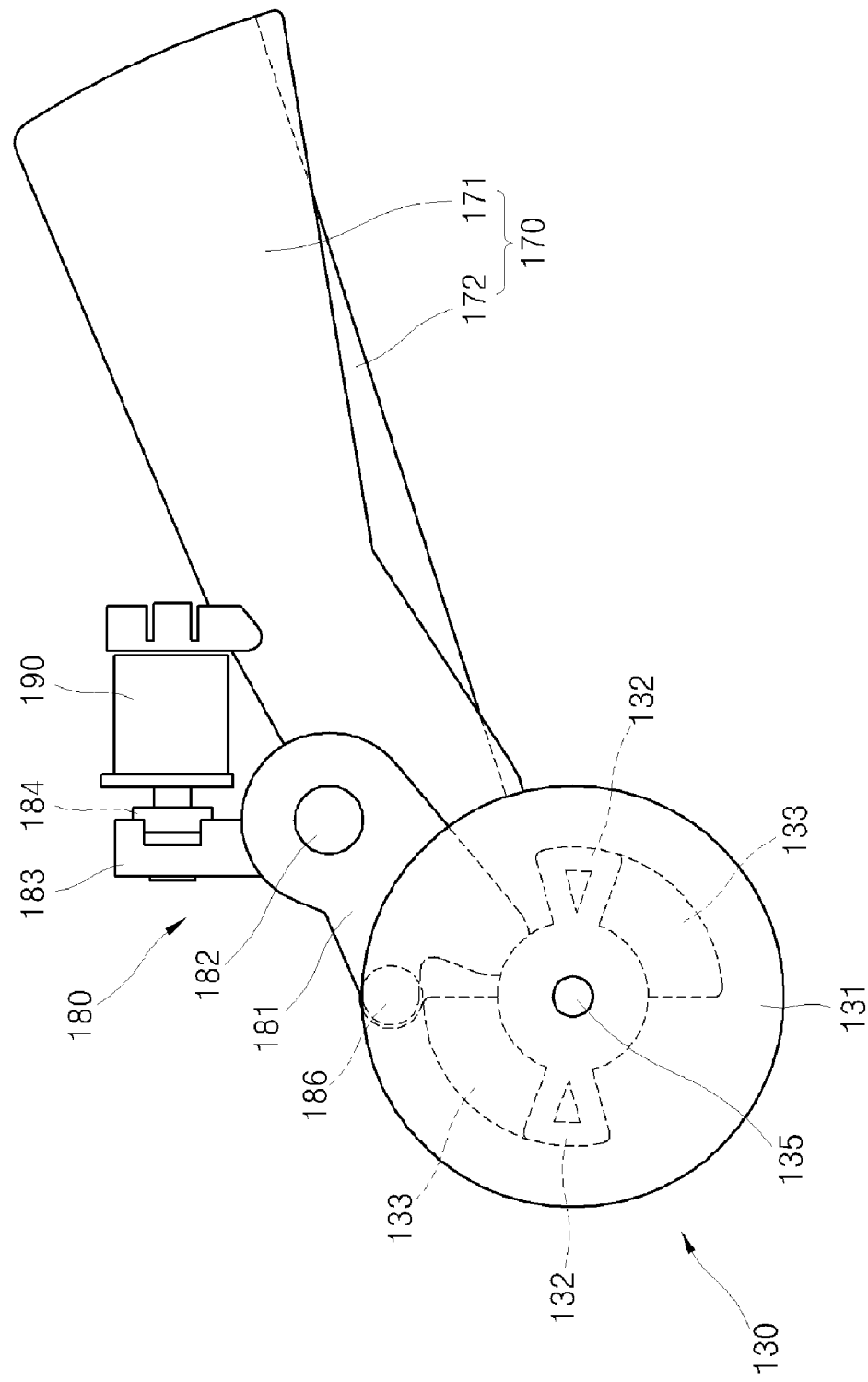
FIG. 14 is a front side view of the cam, a rear curtain, and the rear curtain lever of the focal plane shutter illustrated in FIG. 1.
Figure 15:
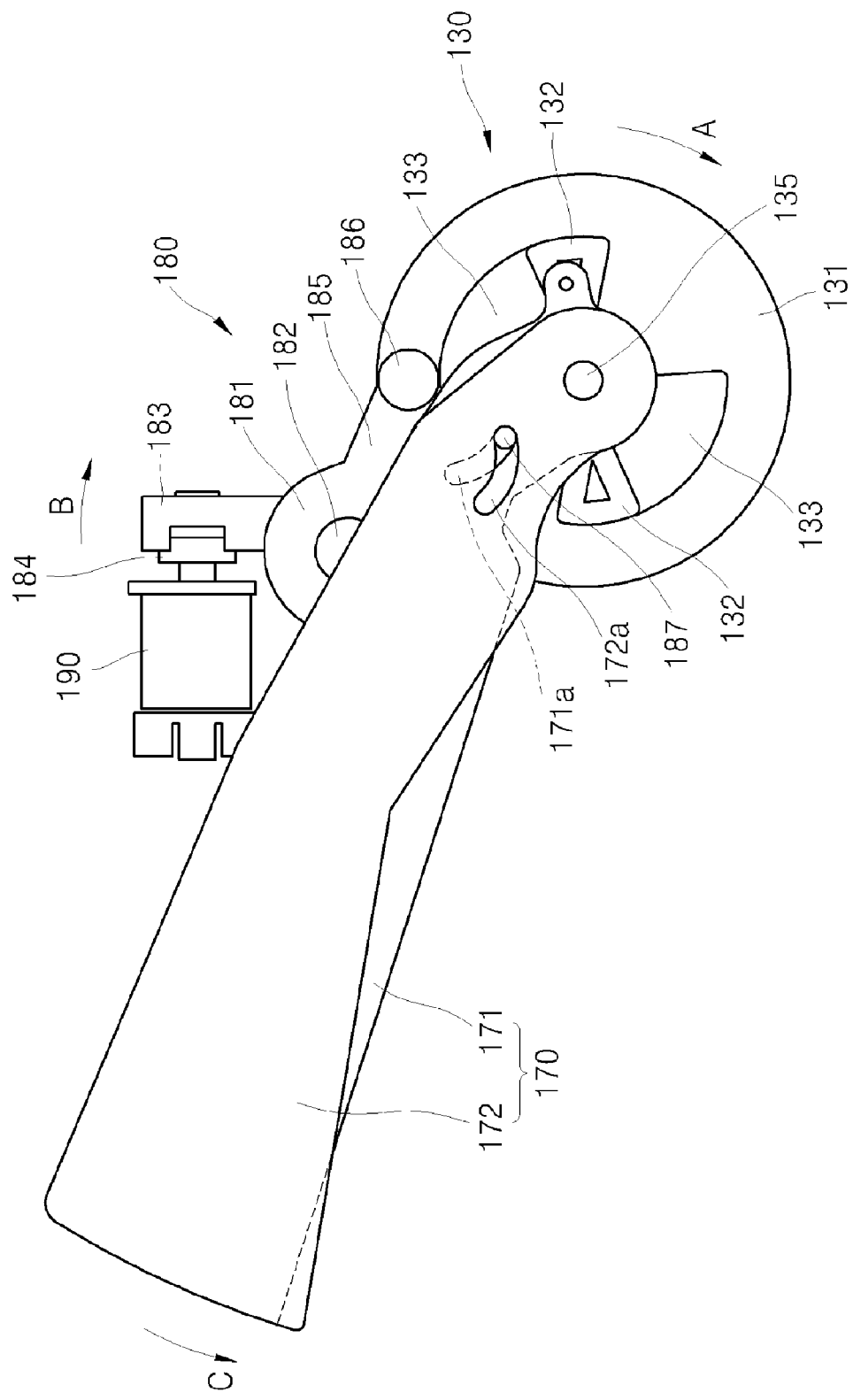
FIG. 15 is a rear side view of the cam, the rear curtain, and the rear curtain lever of the focal plane shutter illustrated in FIG. 1.

FIG. 14 is a front side view of the cam 130, the rear curtain 170, and the rear curtain lever 180 of FIG. 1. FIG. 15 is a rear side view of the cam 130, the rear curtain 170, and the rear curtain lever 180 of FIG. 1.

Referring to FIGS. 14 and 15, a hole is formed in one end of the first rear curtain 171, a hole is formed in one end of the second rear curtain 172, and the holes are fit onto the cam shaft 135. Accordingly, the first rear curtain 171 and the second rear curtain 172 are rotatable about the cam shaft 135.

A first rear curtain guide hole 171*a* is formed in the first rear curtain 171, and a second rear curtain guide hole 172*a* is formed in the second rear curtain 172. The first rear curtain guide hole 171*a* and the second rear curtain guide hole 172*a* are formed at a location corresponding to the rear curtain pin 187 of the rear curtain lever 180. Accordingly, when the first rear curtain 171 and the second rear curtain 172 are fit onto the cam shaft 135, the first rear curtain guide hole 171*a* and the second rear curtain guide hole 172*a* may be fit onto the rear curtain pin 187.

In other words, in the state of FIG. 15, when the cam 130 rotates in a direction indicated by arrow A, the rear curtain control unit 133 no longer supports the rear curtain lever 180, and thus the rear curtain lever 180 is rotated in a direction indicated by arrow B by the elastic force provided by the rear curtain spring 188. When the rear curtain lever 180 rotates in the direction indicated by arrow B, the rear curtain pin 187 moves along the first rear curtain guide hole 171*a* and the second rear curtain guide hole 172*a* as described above, and thus the first rear curtain 171 and the second rear curtain 172 rotate in a direction indicated by arrow C.

Although not shown in FIG. 15, when the cam 130 further rotates in the direction indicated by arrow A, the rear curtain control unit 133 of the cam 130 pushes up the rear curtain lever 180 and thus the rear curtain lever 180 rotates in a direction opposite to the direction indicated by arrow B. When the rear curtain lever 180 rotates in the direction opposite to the direction indicated by arrow B, the rear curtain pin 187 is moved along the first rear curtain guide hole 171*a* and the second rear curtain guide hole 172*a* as described above, and thus the first rear curtain 171 and the second rear curtain 172 rotate in a direction opposite to the direction indicated by arrow C.

As described above, while the cam 130 is rotating in one direction, the rear curtain 170 repeats movements to expose and conceal the aperture 111, and thus the movements of the rear curtain 170 to expose and conceal the aperture 111 can be controlled according to the amount of rotation of the cam 130.

Figure 16:
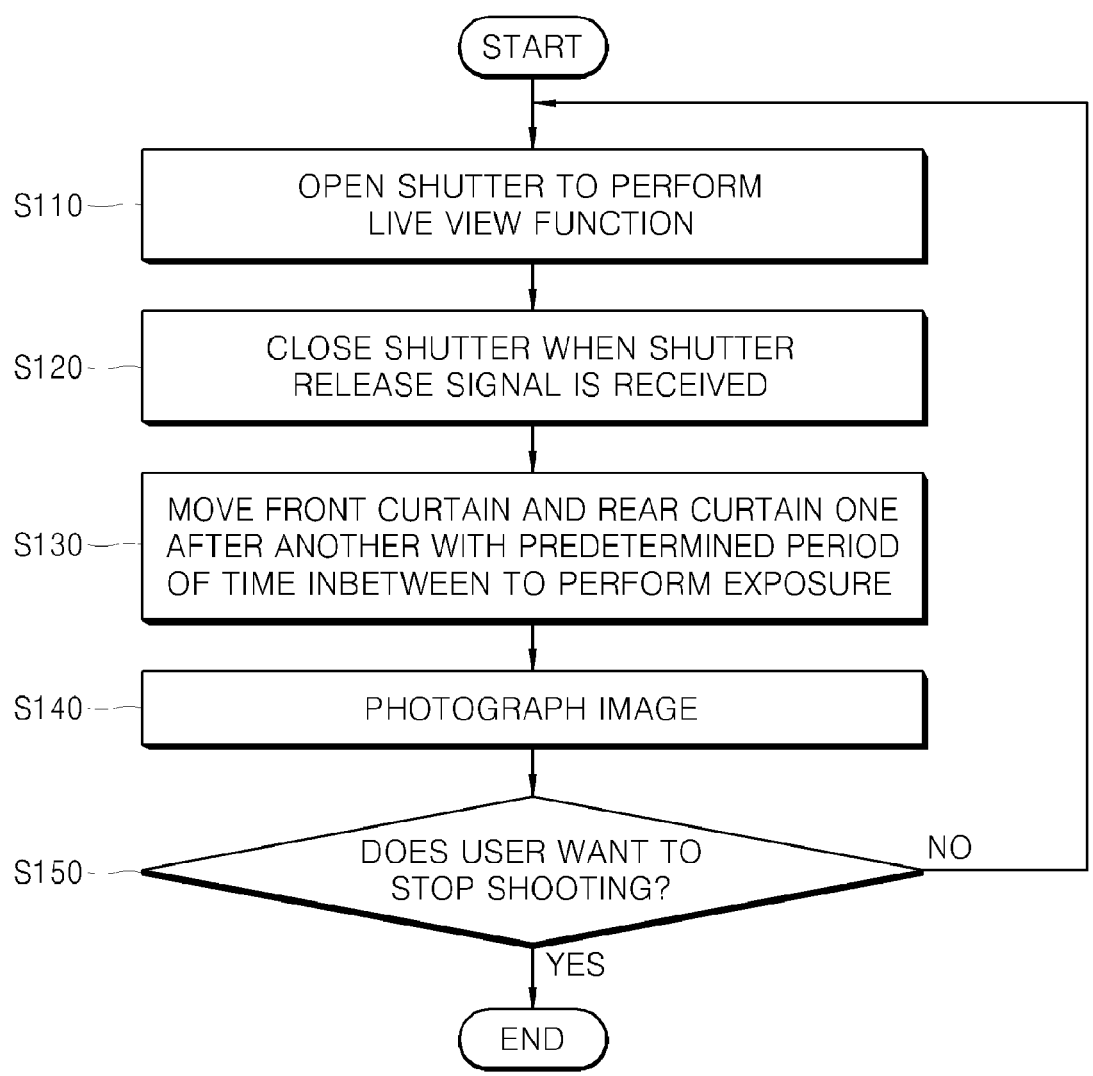
FIG. 16 is a flowchart illustrating an example of a photographing method according to an embodiment of the present invention.

FIG. 16 is an example flowchart illustrating a photographing method according to an embodiment of the present invention. FIGS. 17 through 20 illustrate examples of operations of the photographing method of FIG. 16.

Referring to FIG. 16, in operation S110, a shutter opens to perform a live view function. In operation S120, when a shutter release signal is received from a user, the shutter is closed. In operation S130, a front curtain and a rear curtain of the shutter are moved one after another with a predetermined period of time in between to perform an exposure. In operation S140, an image is photographed.

Figure 17:
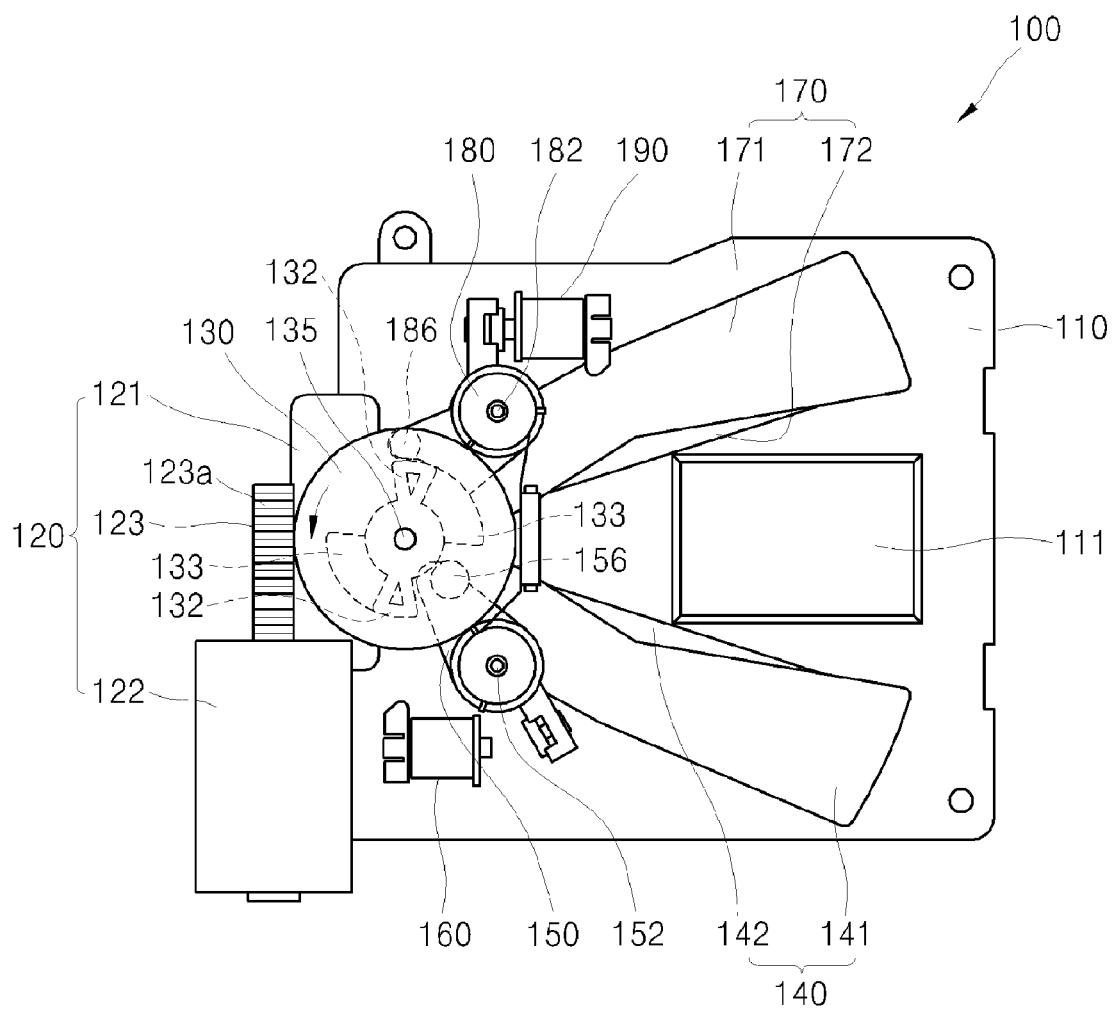
FIGS. 17 through 20 illustrate examples of operations of the photographing method illustrated in FIG. 16.

Operation S110 in which the shutter opens to perform a live view function will now be described in greater detail. As illustrated in FIG. 17, in a live view mode, the front curtain control unit 132 of the cam 130 of the focal plane shutter 100 does not support the front curtain lever 150, and the rear curtain control unit 133 of the cam 130 supports the rear curtain lever 180. Accordingly, the front curtain 140 is lowered and the rear curtain 170 is raised, such that the aperture 111 of the focal plane shutter 100 is exposed or opened and an image of a subject incident through a lens is displayed through an image pickup device on a liquid crystal display (LCD).

In operation S120, when a shutter release signal is received from a user, the shutter closes. In detail, in the state where the live view mode is performed, when a user depresses a shutter release button of a photographing apparatus, both the front curtain 140 and the rear curtain 170 are raised so as to close the focal plane shutter 100, thereby beginning an exposure.

Figure 18:
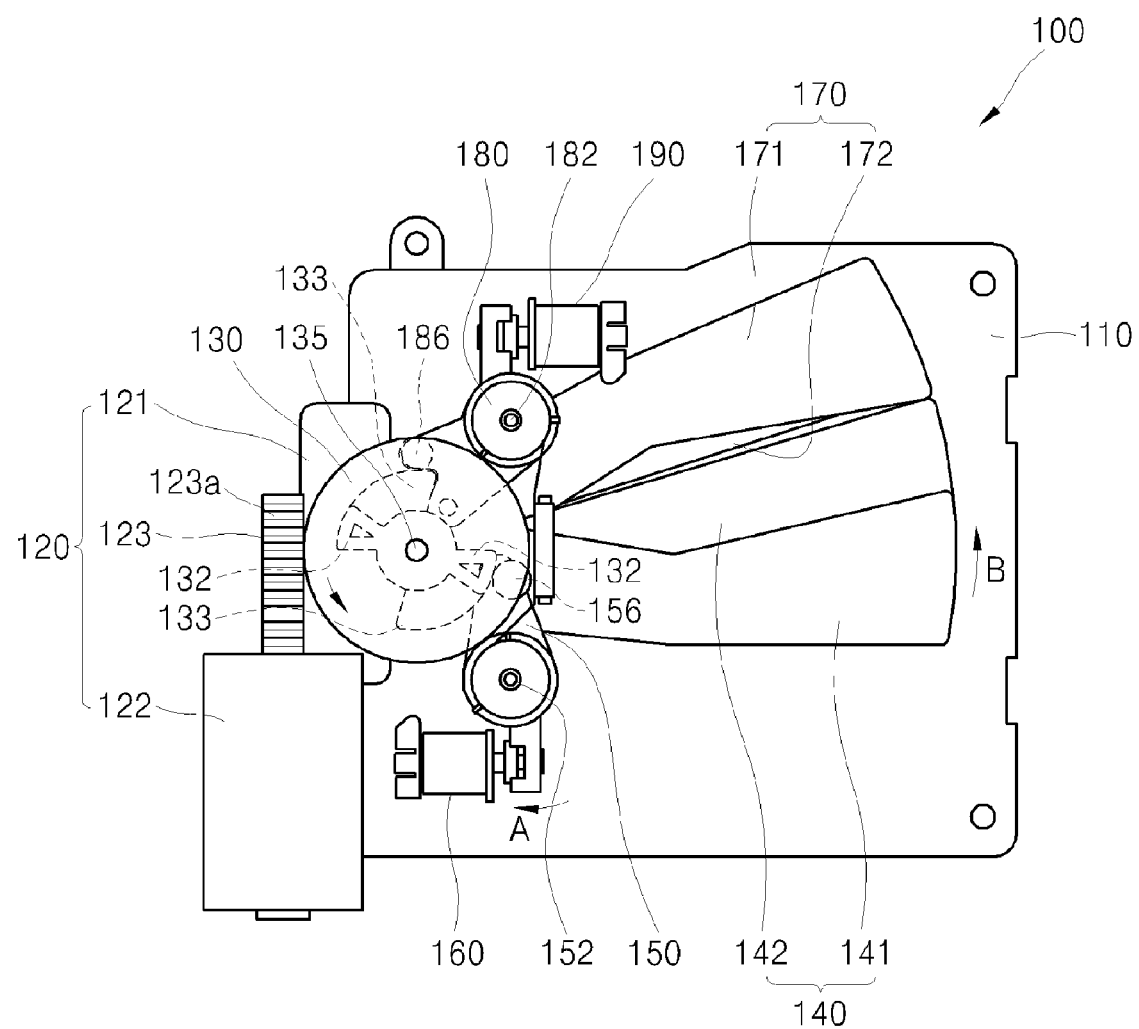

Accordingly, when the user depresses the shutter release button of the photographing apparatus, the cam 130 is rotated counterclockwise a certain angle (for example, about 90 degrees) from the state of FIG. 17, as illustrated in FIG. 18. While the cam 130 is rotating counterclockwise about 90 degrees, the rear curtain control unit 133 continuously supports the rear curtain lever 180 and thus the rear curtain 170 is maintained at a raised state. While the cam 130 is rotating counterclockwise about 90 degrees, the front curtain control unit 132 pushes up the front curtain lever 150 and thus the front curtain lever 150 rotates in a direction indicated by arrow A of FIG. 18. Accordingly, the front curtain 140 rotates in a direction indicated by arrow B of FIG. 18 and is raised.

In this state, since the front and rear curtain levers 150 and 180 are supported by the front and rear curtain control units 132 and 133, respectively, there is no need for electric current to flow through the front and rear curtain magnets 160 and 190 to fix the positions of the front and rear curtains 140 and 170. In other words, special application of electric current to fix the positions of the front and rear curtains 140 and 170 is not needed, and thus battery consumption decreases and a product usage time increases.

In operation S130, the front curtain 140 and the rear curtain 170 of the shutter are moved one after another with a predetermined period of time in between to perform an exposure. In detail, in the state where the aperture 111 of the focal plane shutter 100 is concealed or closed and preparation for an exposure is completed, once various values necessary for actual shooting, such as an exposure time, an auto-focusing (AF) level, and an auto exposure (AE) level, are completely calculated, the front curtain 140 and the rear curtain 170 are lowered at a predetermined interval, to perform an exposure.

Figure 19:
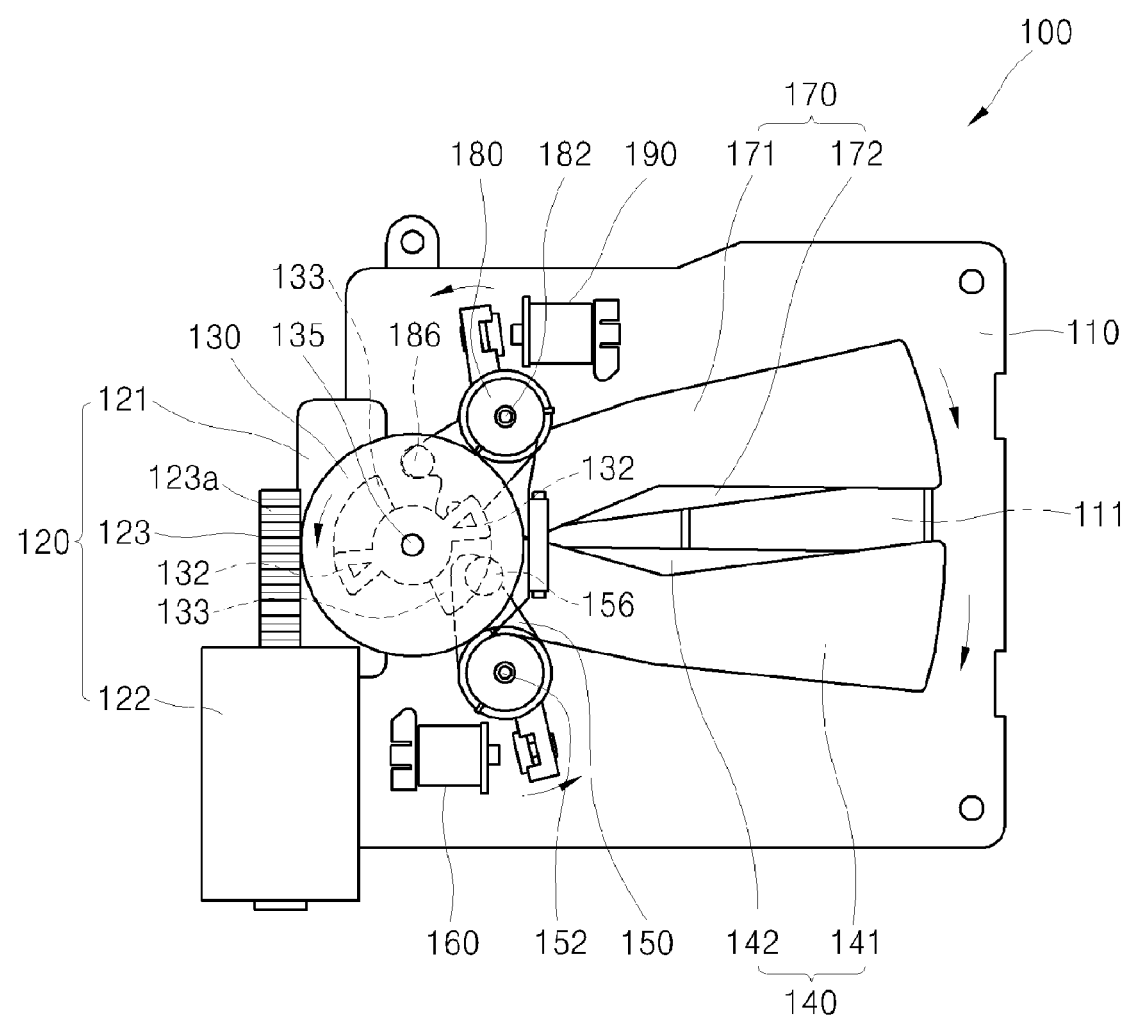

That is, as illustrated in FIG. 19, when an exposure begins, the cam 130 is rotated counterclockwise a certain angle (for example, about 60 degrees) from the state of FIG. 18. In the state of FIG. 19, the front curtain control unit 132 of the cam 130 does not support the front curtain lever 150, and the rear curtain control unit 133 of the cam 130 does not support the rear curtain lever 180.

At this time, since electric current flows through the front curtain magnet 160 and the rear curtain magnet 190 and the front curtain magnet 160 and the rear curtain magnet 190 act as electromagnets, the front curtain 140 and the rear curtain 170 are not lowered by their own weights, but their positions are fixed.

In this state, when the front curtain magnet 160 and the rear curtain magnet 190 are turned off one after another with a predetermined period of time in between, the front curtain 140 and the rear curtain 170 are respectively lowered one after another with a predetermined period of time in between due to their own weights and the elastic forces provided by the front curtain spring 158 and the rear curtain spring 188. Accordingly, the aperture 111 of the focal plane shutter 100 opens at an instant which is a difference between the points of time at which the front curtain 140 and the rear curtain 170 begin to be lowered, to thus perform an exposure.

Figure 20:
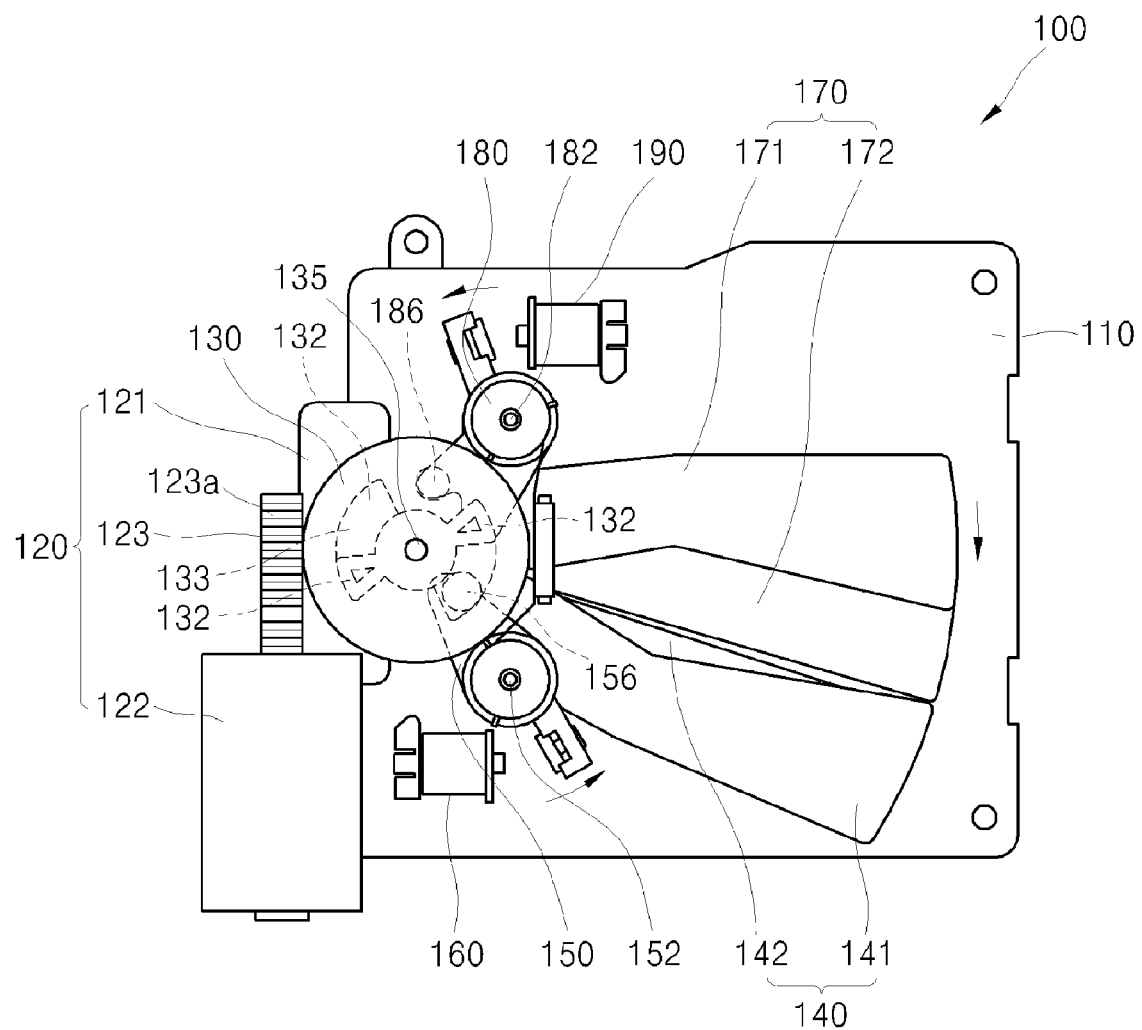

In operation S140, an image is captured. In detail, as illustrated in FIG. 20, when the front curtain 140 and the rear curtain 170 are completely lowered and the exposure is finished, the aperture 111 of the focal plane shutter 100 closes. The image pickup device converts an image of a subject introduced as a light beam by the aperture 111 of the focal plane shutter 100 into an electrical signal to obtain an image signal representing one still image, converts the image signal into a digital signal, and then records the digital signal as a certain image signal through a predetermined process.

Finally, in operation S150, when a user wants to stop shooting, the photographing apparatus is turned off and shooting is stopped. However, when the user wants to take more photographs, the focal pane shutter 100 returns to operation S110, thereby completing one cycle for one shot.

In detail, when one shot is completed, the focal plane shutter 100 prepares for the next shot. In other words, to display an image of a subject introduced through a lens on the LCD via the image pickup device, the focal plane shutter 100 needs to open again. To open the focal plane shutter 100 again, first, the cam 130 is rotated counterclockwise a certain angle (for example, about 30 degrees) from the state of FIG. 20, and thus the state of the focal plane shutter 100 returns to the state of FIG. 17. While the cam 130 is rotating counterclockwise about 30 degrees, the rear curtain control unit 133 of the cam 130 pushes up the rear curtain lever 180 and thus the rear curtain lever 180 rotates clockwise in FIG. 20. Accordingly, the rear curtain 170 is rotated counterclockwise in FIG. 20 and raised. While the cam 130 is rotating counterclockwise about 30 degrees, the front curtain control unit 132 of the cam 130 does not contact the front curtain lever 150, and thus the front curtain 140 is lowered. As a result, the aperture 111 of the focal plane shutter 100 opens, and an image of a subject introduced through the opened focal plane shutter 100 is displayed on the LCD via the image pickup device to thereby perform a live view function. Thus, preparation for next shot is finished, thereby completing one cycle for one shot.

Although only a method of performing a live view function by using the focal plane shutter 100 has been described above, the present invention is not limited thereto. In other words, if a time period during which a shutter is opened is made very short by controlling the rotation speed of a cam, that is, if operation S110 of FIG. 16 is controlled to be performed very quickly, then the shutter is closed immediately after one shot is completed. Accordingly, in this case, a conventional method of performing photography via a viewfinder may be used. In other words, conversion between a general photography mode and a live view photography mode can still be easily made by only controlling the rotation speed of the cam, and thus user convenience is improved.

As described above, a focal plane shutter according to the present invention may have a simple structure, be easily manufactured and controlled, and allow the performing of a live view function.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A focal plane shutter comprising:
a front curtain and a rear curtain moving relative to each other to expose and conceal the focal plane shutter;
a cam independently controlling movements of the front curtain and the rear curtain;
a front curtain lever interposed between the front curtain and the cam to transmit movement of the cam to the front curtain; and
a rear curtain lever interposed between the rear curtain and the cam to transmit movement of the cam to the rear curtain, wherein the cam comprises a front curtain control unit formed in a fan shape having a first angle, and a rear curtain control unit formed in a fan shape having a second angle.

2. The focal plane shutter of claim 1, wherein as the cam rotates, the front curtain lever and the rear curtain lever rotate independently from each other.

3. The focal plane shutter of claim 1, wherein:
the cam comprises a front curtain control unit and a rear curtain control unit; and
the front curtain control unit controls a position of the front curtain lever and the rear curtain control unit controls a position of the rear curtain lever.

4. The focal plane shutter of claim 3, wherein:
while the cam is rotating in one direction, the front curtain exposes or conceals the focal plane shutter according to relative positions of the front curtain control unit and the front curtain lever, and the rear curtain exposes or conceals the focal plane shutter according to relative positions of the rear curtain control unit and the rear curtain lever.

5. A focal plane shutter comprising:
a front curtain and a rear curtain rotating about a rotation shaft and formed to be rotatable independently from each other;
a cam installed on the same side of the focal plane shutter as the front curtain and the rear curtain and rotatable about the rotation shaft, the cam controlling movements of the front curtain and the rear curtain;
a front curtain lever interposed between the front curtain and the cam to transmit a rotation force of the cam to the front curtain; and
a rear curtain lever interposed between the rear curtain and the cam to transmit the rotation force of the cam to the rear curtain, wherein the cam comprises a front curtain control unit formed in a fan shape having a first angle, and a rear curtain control unit formed in a fan shape having a second angle.

6. The focal plane shutter of claim 5, wherein the front curtain and the rear curtain rotate independently from each other as the cam rotates.

7. The focal plane shutter of claim 5, wherein the first angle of the front curtain control unit is different from the second angle of the rear curtain control unit.

8. The focal plane shutter of claim 5, wherein the front curtain control unit and the rear curtain control unit form a step and control rotations of the front curtain and the rear curtain, respectively.

9. The focal plane shutter of claim 8, wherein the front curtain control unit is formed to contact the front curtain lever, and the rear curtain control unit is formed to contact the rear curtain lever.

10. The focal plane shutter of claim 9, wherein:
while the front curtain lever contacts an arc of the front curtain control unit, the front curtain lever maintains a fixed state; and
while the rear curtain lever contacts an arc of the rear curtain control unit, the rear curtain lever maintains a fixed state.

11. The focal plane shutter of claim 9, wherein:
a front curtain magnet is further installed on one side of the front curtain lever, and thus while the front curtain lever contacts the arc of the front curtain control unit, the front curtain lever contacts the front curtain magnet; and
a rear curtain magnet is further installed on one side of the rear curtain lever, and while the rear curtain lever contacts the arc of the rear curtain control unit, the rear curtain lever contacts the rear curtain magnet.

12. The focal plane shutter of claim 11, further comprising:
a front curtain spring providing a predetermined elastic force to the front curtain lever so that the front curtain lever does not contact the front curtain magnet when not contacting the front curtain control unit; and a rear curtain spring providing a predetermined elastic force to the rear curtain lever so that the rear curtain lever does not contact the rear curtain magnet when not contacting the rear curtain control unit.

13. The focal plane shutter of claim 12, wherein:

the front curtain spring provides the predetermined elastic force to the front curtain lever so that the front curtain lever rotates in a direction away from the front curtain magnet; and the rear curtain spring provides the predetermined elastic force to the rear curtain lever so that the rear curtain lever rotates in a direction away from the rear curtain magnet.

14. The focal plane shutter of claim 5, wherein each of the front curtain and the rear curtain comprises at least two films.

15. The focal plane shutter of claim 5, wherein:

a pin protrudes from the front curtain lever;

a guide hole is formed in the front curtain; and a rotation of the front curtain lever is transmitted to the front curtain by inserting the front curtain pin into the guide hole.

16. The focal plane shutter of claim 5, wherein:

a pin protrudes from the rear curtain lever;

a guide hole is formed in the rear curtain; and a rotation of the rear curtain lever is transmitted to the rear curtain by inserting the rear curtain pin into the guide hole.

17. The focal plane shutter of claim 5, wherein:

the focal plane shutter further comprises a motor providing a predetermined driving force; and the cam is rotated in one direction by the driving force provided by the motor.

18. The focal plane shutter of claim 17, wherein a worm gear is coupled with the motor, and grooves are formed at regular intervals on an outer circumference of the cam to engage with the worm gear, such that the driving force of the motor is converted into a rotation of the cam.

19. The focal plane shutter of claim 5, wherein a contact switch is further formed on one surface of the cam, and the amount of rotation of the cam is controlled by the contact switch.

20. A photographing apparatus comprising:

a lens through which light is incident;

an image pickup device converting the incident light into an electrical signal;

a display unit displaying an image formed by the image pickup device; and a focal plane shutter interposed between the lens and the image pickup device to control the amount of light incident upon the image pickup device, the focal plane shutter comprising: a front curtain and a rear curtain moving relative to each other to expose and conceal the focal plane shutter;

a cam independently controlling movements of the front curtain and the rear curtain;

a front curtain lever interposed between the front curtain and the cam to transmit movement of the cam to the front curtain; and a rear curtain lever interposed between the rear curtain and the cam to transmit movement of the cam to the rear curtain, wherein the cam comprises a front curtain control unit formed in a fan shape having a first angle, and a rear curtain control unit formed in a fan shape having a second angle.

21. A photographing method performed with a photographing apparatus comprising a focal plane shutter, the photographing method comprising:

opening the focal plane shutter by using a cam independently controlling rotations of a front curtain and a rear curtain of the focal plane shutter, so as to perform a live view function;

closing the focal plane shutter by rotating the cam, when a shutter release signal is received, wherein the cam comprises a front curtain control unit formed in a fan shape having a first angle, and a rear curtain control unit formed in a fan shape having a second angle;

moving the front curtain and the rear curtain of the focal plane shutter one after another with a predetermined period of time inbetween to perform an exposure; and capturing an image.

22. The method of claim 21, wherein in the opening of the focal plane shutter, the cam supports the rear curtain so that the rear curtain is maintained in a raised state.

23. The method of claim 22, wherein in the closing of the focal plane shutter, while the cam is rotating, the cam supports the rear curtain so that the rear curtain is maintained in a raised state, and simultaneously rotates the front curtain so that the front curtain is independently raised toward the rear curtain.

24. The method of claim 22, between the closing of the focal plane shutter and the moving of the front curtain and the rear curtain, further comprising:

flowing electrical current to the front curtain magnet and the rear curtain magnet;

rotating the cam so that the cam moves away from the front curtain and the rear curtain; and turning off the front curtain magnet and the rear curtain magnet one after another with a predetermined period of time inbetween.

25. The method of claim 21, wherein the opening of the focal plane shutter, the closing of the focal plane shutter, the moving of the front curtain and the rear curtain, and the photographing of the image are repeatedly performed.

26. The method of claim 25, between the photographing of the image and the opening of the focal plane shutter, further comprising rotating the cam so that the front curtain is maintained at a lowered state while simultaneously raising the rear curtain independently from the front curtain.

27. The method of claim 21, further comprising:

opening the focal plane shutter by using a cam independently controlling rotations of a front curtain and a rear curtain of the focal plane shutter;

rotating a mirror in the focal plane;

closing the focal plane shutter by rotating the cam, so as to permit viewing through a viewfinder;

in response to a shutter release signal, rotating the mirror out of the focal plane;

moving the front curtain and the rear curtain of the focal plane shutter one after another with a predetermined period of time inbetween to perform an exposure; and capturing an image.

* * * * *